(12) United States Patent
Takei

(10) Patent No.: US 10,149,180 B2
(45) Date of Patent: Dec. 4, 2018

(54) RADIO COMMUNICATION SYSTEM, ELEVATOR CONTROL SYSTEM USING SAME, AND SUBSTATION FACILITY MONITORING SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/762,891

(22) PCT Filed: Jun. 26, 2017

(86) PCT No.: PCT/JP2017/023331
§ 371 (c)(1),
(2) Date: Mar. 23, 2018

(87) PCT Pub. No.: WO2018/008437
PCT Pub. Date: Jan. 11, 2018

(65) Prior Publication Data
US 2018/0262923 A1   Sep. 13, 2018

(30) Foreign Application Priority Data

Jul. 7, 2016  (JP) ................................ 2016-134849

(51) Int. Cl.
*H04B 7/00* (2006.01)
*H04W 24/02* (2009.01)
(Continued)

(52) U.S. Cl.
CPC .............. *H04W 24/02* (2013.01); *H04B 7/04* (2013.01); *H04B 7/10* (2013.01); *H04W 40/02* (2013.01)

(58) Field of Classification Search
None
See application file for complete search history.

(56) References Cited

U.S. PATENT DOCUMENTS

| 6,442,371 B1 * | 8/2002 | Lyu | G01R 23/17 324/637 |
| 7,003,058 B2 * | 2/2006 | Bach | H04B 1/525 356/453 |

(Continued)

FOREIGN PATENT DOCUMENTS

| JP | 2000-115044 A | 4/2000 |
| JP | 2014-27500 A | 2/2014 |

(Continued)

OTHER PUBLICATIONS

International Search Report (PCT/ISA/210) issued in PCT Application No. PCT/JP2017/023331 dated Sep. 5, 2017 with English translation (four (4) pages).

(Continued)

*Primary Examiner* — Tuan A Tran
(74) *Attorney, Agent, or Firm* — Crowell & Moring LLP

(57) ABSTRACT

A radio device includes a transmitter and a receiver. The transmitter transmits rotationally polarized radio waves in a plurality of transmission propagation directions using a plurality of antennas. The receiver receives rotationally polarized radio waves in a plurality of reception propagation directions using a plurality of antennas. The receiver measures changes in rotational loci of polarizations of the radio waves received in the plurality of reception propagation directions corresponding to radio waves transmitted in a plurality of transmission propagation directions. The transmitter performs transmission using a reception propagation direction at which the changes measured by the receiver in the rotational loci of the polarizations of the received radio waves stop.

12 Claims, 12 Drawing Sheets

(51) Int. Cl.
*H04W 40/02* (2009.01)
*H04B 7/04* (2017.01)
*H04B 7/10* (2017.01)

(56) References Cited

U.S. PATENT DOCUMENTS

| | | | | |
|---|---|---|---|---|
| 7,965,993 | B2* | 6/2011 | Lindgren | H04B 7/10 455/226.1 |
| 9,178,617 | B2* | 11/2015 | Kikuchi | H04B 10/2507 |
| 9,231,687 | B2* | 1/2016 | Noh | H04B 7/10 |
| 9,407,349 | B2* | 8/2016 | Takei | H04B 7/10 |
| 9,705,588 | B2* | 7/2017 | Aono | H04B 7/26 |
| 9,762,296 | B2* | 9/2017 | Takei | H04L 27/0002 |
| 2011/0102265 | A1 | 5/2011 | Jiang et al. | |
| 2013/0336417 | A1* | 12/2013 | Takei | H04B 7/10 375/267 |
| 2014/0147117 | A1* | 5/2014 | Kikuchi | H04B 10/2507 398/65 |
| 2015/0318909 | A1 | 11/2015 | Zhang et al. | |
| 2016/0182185 | A1 | 6/2016 | Takei | |
| 2016/0255499 | A1* | 9/2016 | Takei | H04K 1/08 455/410 |
| 2017/0033810 | A1* | 2/2017 | Crouch | H04B 7/10 |

FOREIGN PATENT DOCUMENTS

| | | |
|---|---|---|
| JP | 2016-511566 A | 4/2016 |
| WO | WO 2015/056353 A1 | 4/2015 |

OTHER PUBLICATIONS

Japanese-language Written Opinion (PCT/ISA/237) issued in PCT Application No. PCT/JP2017/023331 dated Sep. 5, 2017 (three (3) pages).
Singapore Office Action issued in counterpart Singapore Application No. 11201802411X dated Jun. 19, 2018 with English translation (eight (8) pages).

* cited by examiner

FIG. 4A FIG. 4B FIG. 4C FIG. 4D FIG. 4E
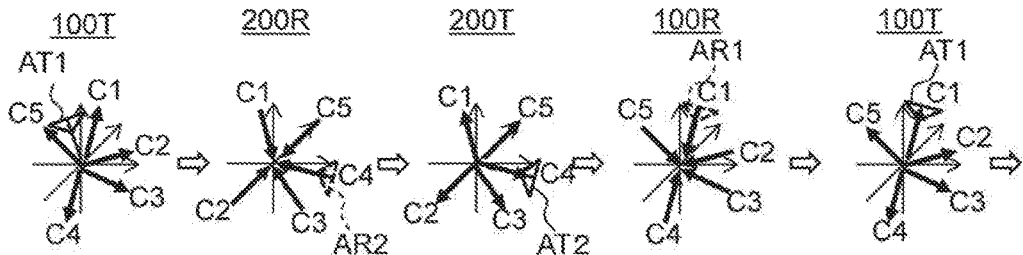
FIG. 5
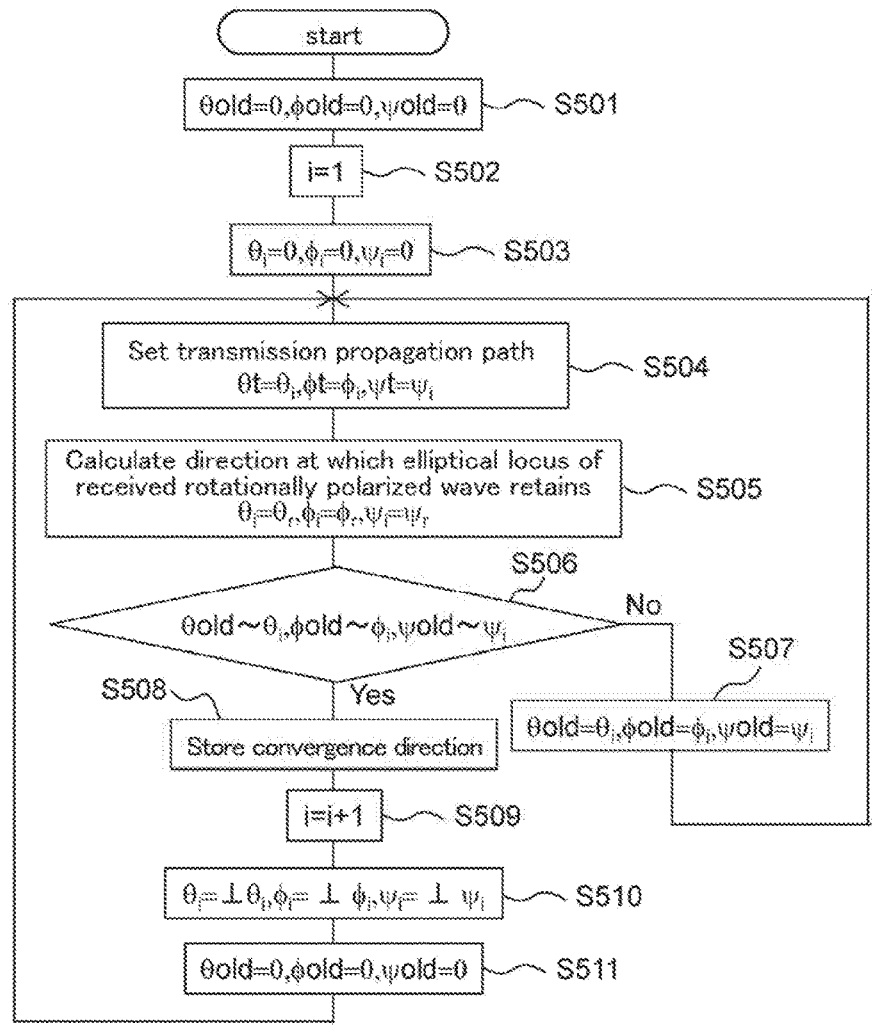

RADIO COMMUNICATION SYSTEM, ELEVATOR CONTROL SYSTEM USING SAME, AND SUBSTATION FACILITY MONITORING SYSTEM

TECHNICAL FIELD

The present invention relates to a radio system, as well as an elevator control system and a substation facility monitoring system both using the same.

BACKGROUND ART

Highly efficient operation of a social infrastructure system for producing and distributing energy, water, gas, oil and the like has become increasingly important to realize a society capable of sustainable development. The highly efficient operation of the social infrastructure system will be achieved by making apparatuses included in the system work with high efficiency. This requires an apparatus monitoring and controlling network capable of highly efficient operation.

A promising technique for the highly efficient apparatus operation is estimation/forecasts of working conditions of an apparatus based on a wide range of data obtained from many sensors arranged around the apparatus.

A network is used to gather and analyze data from many sensors, to estimate the working conditions of an apparatus and to send control information to the apparatus. In this network, the number of transmission paths from the sensors is extraordinarily large. Against this background, therefore, it is desirable that the network be built using wireless technologies instead of conventional wired technologies.

The social infrastructure system provides the society with lifelines. For this reason, even in a case where specific ones of transmission paths in the network naturally fail or are artificially interfered with, the social infrastructure needs to fulfill the function of providing appropriate lifelines by performing communications while avoiding failed or obstructed transmission paths.

In general, in radio communications, transmission paths are in an open space, and multiple transmission paths are automatically created between a transmitting point and a receiving point. In general, meanwhile, communications are transmitted and received in batches. For these reasons, when specific transmission paths naturally fail or are artificially interfered with, the communication quality of the network deteriorates to a large extent, and may even go as far as to ruin the network.

On the other hand, wired communications allow a third party to identify transmission paths. When a third party finds and intrudes into a transmission path, lifeline supply will be seriously affected. This possibility cannot be denied.

In other words, neither wireless nor wired communications using the conventional techniques have yet achieved a network which is highly robust against man-made or natural failure and interference in specific transmission paths.

To sensors installed in an apparatus included in the social infrastructure system and actuators for controlling the apparatus, the apparatus itself works as an electromagnetic wave scatterer. In a radio network using an electromagnetic wave as a communication medium, therefore, it cannot be expected that a radio device included in this network performs communications along a line of sight. The radio network is thus operated in an abnormal environment which uses a wave not traveling in a line of sight, that is to say, a multi-reflected wave resulting from reflections by apparatuses.

An electromagnetic wave is a vector wave. Reflection causes a unique change in the radio wave's physical actual condition, so-called "polarization" perpendicular to the traveling direction. Radio waves with the same polarization automatically emitted in multiple directions from a transmitter are uniquely reflected by multiple apparatuses, and arrive at a receiver as radio waves with a unique change in the polarization, through multiple propagation paths.

As a result, the receiver is forced to use an unpredictable polarization direction which results from synthesizing the vectors of the arriving radio waves. Because of symmetry between the transmission and the reception in radio communications using an electromagnetic wave, an unpredictable change in the polarization direction caused between the transmission and the reception is unique to the specific pair of transmitter and receiver, and the polarization direction irregularly changes at every moment as the radio wave environment changes.

The radio device is required to perform transmission and reception appropriately even in this unpredictably and irregularly changing radio wave environment.

A solution to this problem is provided by Patent Literature 1.

Patent Literature 1 discloses a polarized wave diversity transmission system. Patent Literature 1 states as follows (see Abstract): "PROBLEM TO BE SOLVED: To provide a polarized wave diversity transmission system for obtaining large fading improvement effect in a mobile communication, etc. SOLUTION: A transmitter 1 sends a radio wave which is circular polarized wave or 45° or 135° polarized wave from an antenna 2. The radio wave is made incident on vertical and horizontal reception antennas 4 and 5 and orthogonally polarized components are received, respectively. Their receive signals are supplied to receivers 6 and 7 and a diversity reception circuit 8 selects one of the outputs of the receivers or combines them together, so that a reception output circuit 9 obtains the output of the polarized wave diversity reception".

As described above, the technique disclosed in Patent Literature 1 deals with the problem using the communication system in which: the transmitter sends an electromagnetic wave with a rotating polarization which is temporally different; and the receiver receives two polarized waves fixedly orthogonal to each other.

CITATION LIST

Patent Literature

Patent Literature 1: Japanese Patent Application Publication No. 2000-115044

SUMMARY OF INVENTION

Technical Problem

The technique disclosed in Patent Literature 1, however, involves problems of: incapability of identifying multiple propagation paths which are formed between the transmitter and the receiver and which are likely to change at every moment; and large fluctuations in communication quality depending on man-made or natural failure and interference in specific transmission paths.

The present invention has been made with the above problems taken into consideration. An object of the present invention is to provide a radio system which is highly robust against man-made or natural failure and interference in specific transmission paths. Another object of the present invention is to provide an elevator control system and a substation facility monitoring system both using the radio system.

Solution to Problem

To solve the above problems, the present invention is configured as follows.

A radio system according to the present invention includes a radio device including a transmitter and a receiver.

The transmitter transmits rotationally polarized radio waves in multiple transmission propagation directions using multiple antennas. The receiver receives rotationally polarized radio waves in multiple reception propagation directions using multiple antennas. The receiver measures changes in rotational loci of polarizations of the radio waves received in the multiple reception propagation directions corresponding to radio waves transmitted in multiple transmission propagation directions. The transmitter performs transmission using a reception propagation direction at which the changes measured by the receiver in the rotational loci of the polarizations of the received radio waves stop.

Other means will be described in embodiments to carry out the invention.

Advantageous Effects of Invention

According to the present invention, it is possible to provide a radio system which is highly robust against man-made or natural failure and interference in specific transmission paths. In addition, it is possible to provide an elevator control system and a substation facility monitoring system both using the radio system.

BRIEF DESCRIPTION OF DRAWINGS

FIG. 2A illustrates the transmitted rotationally polarized wave, and FIG. 2B illustrates the received rotationally polarized wave.

FIGS. 4A to 4E illustrate reflected waves incoming to radio devices each including a transmitter and a receiver according to the second embodiment of the present invention, as well as radio waves emitted from the radio devices. FIGS. 4A to 4E illustrate an example of how the transmitters and the receivers find desirable antenna radio wave directions in cooperation, following an order.

FIG. 5 is a diagram illustrating an example of a flow for controlling transmission and reception propagation directions in the radio system according to the second embodiment of the present invention.

DESCRIPTION OF EMBODIMENTS

Hereinafter, embodiments of the present invention (hereinafter referred to as "embodiments") will be described with reference to the accompanying drawings as appropriate.

First Embodiment

Figure 1:
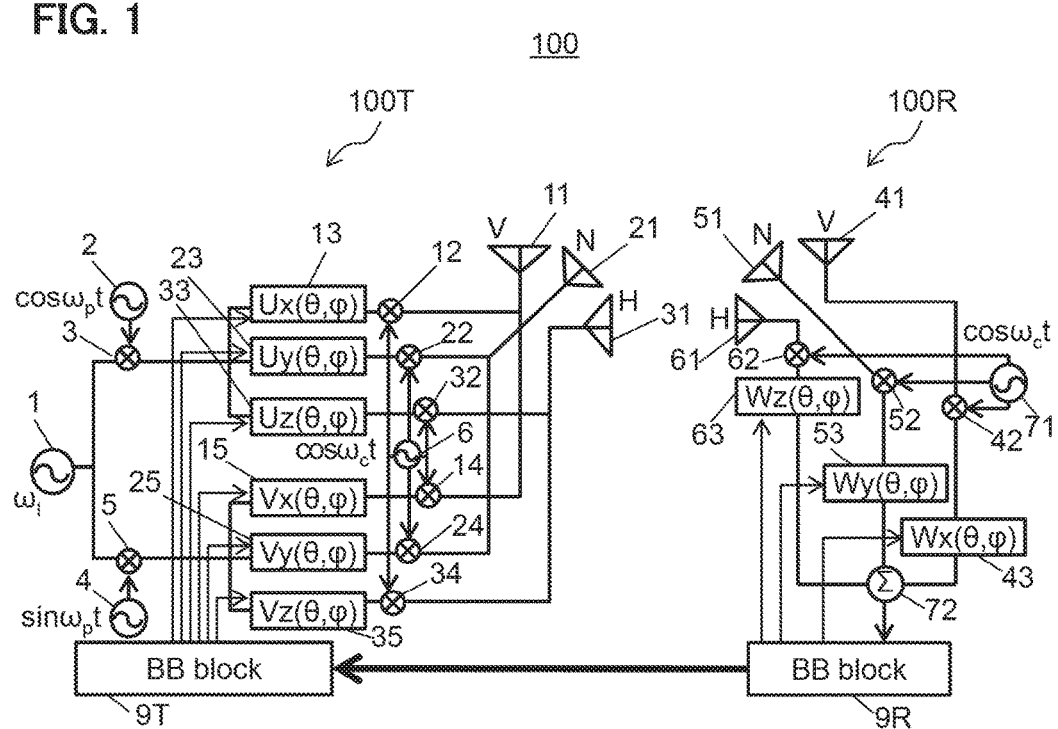
FIG. 1 is a diagram illustrating a configuration example of a radio device in a radio system according to a first embodiment of the present invention.

Referring to FIGS. 1 and 2, a description will be given of a configuration example of radio devices included in a radio system according to a first embodiment of the present invention, in which transceivers using rotational polarization selectively use multiple rotationally polarized wave propagation paths FIG. 1 is a diagram illustrating a configuration example of a radio device 100 in the radio system according to the first embodiment of the present invention.

In FIG. 1, the radio device 100 includes a transmitter 100T and a receiver 100R.

<<Schematic Configurations of Transmitter 100T and Receiver 100R>>

The transmitter 100T includes an information signal generator ($\omega_I$) 1, a polarization rotation cosine oscillator (cos $\omega_p t$) 2, a polarization rotation sine oscillator (sin $\omega_p t$) 4, a first multiplier 3, a second multiplier 5 and a baseband circuit (BB block) 9T.

The transmitter 100T further includes a first cosine weighter (Ux($\theta$, $\varphi$)) 13, a second cosine weighter (Uy($\theta$, $\varphi$)) 23, a third cosine weighter (Uz($\theta$, $\varphi$)) 33, a first sine weighter (Vx($\theta$, $\varphi$)) 15, a second sine weighter (Vy($\theta$, $\varphi$)) 25 and a third sine weighter (Vz($\theta$, $\varphi$)) 35.

The transmitter 100T further includes a carrier frequency generator (cos $\omega_c t$) 6, a first cosine mixer 12, a second cosine mixer 22, a third cosine mixer 32, a first sine mixer 14, a second sine mixer 24 and a third sine mixer 34.

The transmitter 100T further includes a first transmission antenna (V) 11, a second transmission antenna (N) 21 and a third transmission antenna (H) 31.

The receiver 100R includes a first reception antenna (V) 41, a second reception antenna (N) 51 and a third reception antenna (H) 61.

The receiver 100R further includes a first reception mixer 42, a second reception mixer 52, a third reception mixer 62, and a local oscillator (cos $\omega_c t$) 71.

The receiver 100R further includes a first reception weighter (Wx($\theta$, $\varphi$)) 43, a second reception weighter (Wy($\theta$, $\varphi$)) 53, a third reception weighter (Wz($\theta$, $\varphi$)) 63, a reception combiner ($\Sigma$) 72, and a baseband circuit (BB block) 9R.

It should be noted that the baseband circuit (BB block) 9T of the transmitter 100T and the baseband circuit (BB block) 9R of the receiver 100R jointly form a baseband circuit 9 as a single circuit.

The radio device 100 including the transmitter 100T and the receiver 100R is jointly controlled by the baseband circuit 9 (9T, 9R).

<<Transmitter 100T>>

In the transmitter 100T, the information signal generator 1 generates or produces information signal of the transmitter 100T.

An output from the information signal generator 1 is branched into two output signals, one of which is passed to the first multiplier 3 and the other of while is passed to the second multiplier 5.

The first multiplier 3 superimposes the output from the information signal generator ($\omega_I$) 1 onto an output from the polarization rotation cosine oscillator (cos $\omega_p t$) 2.

The second multiplier 5 superimposes the output from the information signal generator ($\omega_I$) 1 onto an output from the polarization rotation sine oscillator (sin $\omega_p t$) 4.

These multipliers superimpose (modulate) the information signal ($\omega_I$) onto (with) cos $\omega_p t$ and sin $\omega_p t$ representing the two carrier waves, respectively.

A signal obtained by the superimposition by the first multiplier 3 is branched into three signals, which are respectively passed to the first cosine weighter (Ux($\theta$, $\varphi$)) 13, the second cosine weighter (Uy($\theta$, $\varphi$)) 23, and the third cosine weighter (Uz($\theta$, $\varphi$)) 33.

A signal obtained by the superimposition by the second multiplier 5 is branched into three signals, which are respectively passed to the first sine weighter (Vx($\theta$, $\varphi$)) 15, the second sine weighter (Vy($\theta$, $\varphi$)) 25, and the third sine weighter (Vz($\theta$, $\varphi$)) 35.

Incidentally, for example, the subscript x in the first cosine weighter (Ux($\theta$, $\varphi$)) 13 means that the first cosine weighter (Ux($\theta$, $\varphi$)) 13 is connected with the X direction, and Euler angles $\theta$, $\varphi$ in the first cosine weighter (Ux($\theta$, $\varphi$)) 13 means that the direction of the polarization vector, which will be described later, changes depending on weight assignment.

In addition, the subscripts and Euler angles in the second cosine weighter (Uy($\theta$, $\varphi$)) 23, the third cosine weighter (Uz($\theta$, $\varphi$)) 33, the first sine weighter (Vx($\theta$, $\varphi$)) 15, the second sine weighter (Vy($\theta$, $\varphi$)) 25, and the third sine weighter (Vz($\theta$, $\varphi$)) 35 have similar meaning.

Furthermore, the first cosine weighter 13, the second cosine weighter 23, the third cosine weighter 33, the first sine weighter 15, the second sine weighter 25, and the third sine weighter 35 are controlled by the baseband circuit (BB block) 9T.

The first cosine mixer 12, the second cosine mixer 22, the third cosine mixer 32 respectively up-convert the outputs from the first cosine weighter 13, the second cosine weighter 23 and the third cosine weighter 33 using an output from the carrier frequency generator (cos $\omega_c t$) 6.

The first sine mixer 14, the second sine mixer 24, and the third sine mixer 34 respectively up-convert the outputs from the first sine weighter 15, the second sine weighter 25 and the third sine weighter 35 using the output from the carrier frequency generator (cos $\omega_c t$) 6.

An output from the first cosine mixer 12 and an output from the first sine mixer 14 are inputted into the first transmission antenna (V) 11.

An output from the second cosine mixer 22 and an output from the second sine mixer 24 are inputted into the second transmission antenna (N) 21.

An output from the third cosine mixer 32 and an output from the third sine mixer 34 are inputted into the third transmission antenna (H) 31.

The first transmission antenna (V) 11, the second transmission antenna (N) 21 and the third transmission antenna (H) 31 are each a polarized antenna for outputting a polarized electromagnetic wave, and are arranged spatially orthogonal to one another.

The electrical signal inputted into the first transmission antenna (V) 11 is converted into a radio wave (electromagnetic wave) radiated into space in a vertical direction.

The electrical signal inputted into the second transmission antenna (N) 21 is converted into a radio wave (electromagnetic wave) radiated into space in a normal direction.

The electrical signal inputted into the third transmission antenna (H) 31 is converted into a radio wave (electromagnetic wave) radiated into space in a horizontal direction.

Incidentally, the vertical direction (V), the normal direction (N) and the horizontal direction (H) mean that directions in which the three antennas radiate their respective polarized waves are orthogonal to one another in the three-dimensional space, and do not mean that there is an absolute standard.

<<Receiver 100R>>

In the receiver 100R, the first reception antenna (V) 41, the second reception antenna (N) 51 and the third reception antenna (H) 61 are each a polarized antenna for receiving a polarized electromagnetic wave, and are arranged spatially orthogonal to one another.

The radio wave (electromagnetic wave) incident on the first reception antenna (V) 41 from space in a vertical direction is converted into an electrical signal. This electrical signal is outputted to the first reception mixer 42.

The radio wave (electromagnetic wave) incident on the second reception antenna (N) 51 from space in a normal direction is converted into an electrical signal. This electrical signal is outputted to the second reception mixer 52.

The radio wave (electromagnetic wave) incident on the third reception antenna (H) 61 from space in a horizontal direction is converted into an electrical signal. This electrical signal is outputted to the third reception mixer 62.

The first reception mixer 42, the second reception mixer 52 and the third reception mixer 62 respectively down-convert the electrical signals outputted from the first reception antenna (V) 41, the second reception antenna (N) 51 and the third reception antenna (H) 61, using an output from the local oscillator (cos $\omega_c t$) 71.

Incidentally, the output from the local oscillator (cos $\omega_c t$) 71 and the output from the carrier frequency generator (cos $\omega_c t$) 6 have the same frequency.

The signals down-converted by the first reception mixer 42, the second reception mixer 52 and the third reception mixer 62 are respectively inputted into the first reception weighter (Wx(θ, φ)) 43, the second reception weighter (Wy(θ, φ)) 53, and the third reception weighter (Wz(θ, φ)) 63.

Weight coefficients of the first reception weighter 43, the second reception weighter 53, and the third reception weighter 63 are controlled by the baseband circuit 9 (9R).

Outputs from the first reception weighter 43, the second reception weighter 53, and the third reception weighter 63 are inputted into the reception combiner (Σ) 72, and are combined by the reception combiner (Σ) 72.

An output resulting from the combination by the reception combiner (Σ) 72 is inputted into the baseband circuit 9 (9R).

<<Principle of Rotational Polarization (Circular Polarization)>>

The transmitter 100T and the receiver 100R each have the three antennas (polarized antennas) which are spatially orthogonal to one another, as described above. The reason why the transmitter 100T and the receiver 100R are each provided with the three polarized antennas spatially orthogonal to one another is that electromagnetic waves with rotational polarization are used for radio communication.

An easy-to-understand description will be hereinbelow provided for the principle of the rotational polarization (circular polarization) to be used in a two-dimensional space (by two polarized antennas spatially orthogonal to each other).

For example, the following Formula 1 is well known as Euler's formula in the complex plane:

$$\exp(i\theta) = \cos\theta + i \cdot \sin\theta \quad \text{(Formula 1)}$$

where i is an imaginary unit, and θ is a rotation angle.

As θ changes in Formula 1, the vector represented by Formula 1 moves (rotates) along the circumference of a circle while drawing the circle. In addition, cos θ is a real number, while i·sin θ is an imaginary number. In a complex plane with real axis and imaginary axis (i), cos θ and i·sin θ represents a vector, which moves and rotates along the circumference of a circle.

The orthogonality between the real axis and the imaginary axis corresponds to the orthogonality between the spatial directions of the transmission antennas according to the first embodiment of the present invention, e.g., the first transmission antenna (V) 11 and the third transmission antenna (H) 31.

The orthogonality between the real axis and the imaginary axis further corresponds to the radiation of an electromagnetic wave polarized with cos $\omega_p t$ from the first transmission antenna (V) 11 and the radiation of an electromagnetic wave polarized with sin $\omega_p t$ from the third transmission antenna (H) 31.

In other words, the first transmission antenna (V) 11 and the third transmission antenna (H) 31 are arranged spatially orthogonal to each other; the first transmission antenna (V) 11 radiates a radio wave obtained by converting an electrical signal of cos $\omega_p t$; and the third transmission antenna (H) 31 radiates a radio wave obtained by converting an electrical signal of sin $\omega_p t$, then, the two radio waves are combined into an electromagnetic wave (radio wave) with a rotational polarization (circular polarization) which circularly rotates in the space.

The foregoing explanation has been provided on the assumption that the amplitude of the wave polarized with cos $\omega_p t$ and the amplitude of the wave polarized with sin $\omega_p t$ are the same, for the purpose of simplifying the explanation. When the first cosine weighter (Ux(θ, φ)) 13 and the third sine weighter (Vz(θ, φ)) 35 are controlled to change their respective weighting factors to change the relationship between the amplitude of the wave polarized with cos $\omega_p t$ and the amplitude of the wave polarized with sin $\omega_p t$, the resultant rotating polarization (rotational polarization) is an elliptical polarization, rather than a circular polarization.

In addition, when a path through which the electromagnetic wave propagates affects the electromagnetic wave such that a decrease in the amplitude is different between the orthogonal polarized waves in the electromagnetic wave, the rotational polarization may change into an elliptical polarization.

The foregoing explanation has been provided as to rotational polarization in the two-dimensional space, for the purpose of simplifying the explanation. The rotational polarization in a three-dimensional space can be produced based on the same principle. That is, use of three antennas spatially orthogonal to one another produces rotational polarization in the three-dimensional space.

In the transmitter 100T according to the first embodiment of the present invention, the first transmission antenna (V) 11, the second transmission antenna (N) 21 and the third transmission antenna (H) 31 are arranged spatially orthogonal to one another, that is to say, such that the polarized waves are respectively radiated from the transmission antennas in the vertical, normal and horizontal directions.

Similarly, in the receiver 100R according to the first embodiment of the present invention, the first reception antenna (V) 41, the second reception antenna (N) 51 and the third reception antenna (H) 61 are arranged spatially orthogonal to one another, that is to say, such that the polarized waves are respectively radiated from or are incident onto the reception antennas in the vertical, normal and horizontal directions.

<<Functions of Transmitter 100T and Receiver 100R>>

Because of the above-described configuration, the transmitter 100T according to this (first) embodiment is capable of making the propagation frequency match the frequency of the carrier frequency generator 6 in an arbitrary direction in the three-dimensional space by properly adjusting the weight coefficients of the first cosine weighter 13, the second cosine weighter 23 and the third cosine weighter 33, the first sine weighter 15, the second sine weighter 25, and the third sine weighter 35.

The transmitter 100T is further capable of transmitting a rotationally polarized wave whose rotational frequency matches the frequencies of the polarization rotation cosine oscillator 2 and the polarization rotation sine oscillator 4.

Because of the above-described configuration, the receiver 100R according to this (first) embodiment is capable of receiving a rotationally polarized wave whose polarization elliptically rotates at the same rotational frequency as that of a rotationally polarized wave obtained by combining multiple rotationally polarized waves arriving in arbitrary directions in the three-dimensional space as illustrated in FIG. 2, by appropriately adjusting the weight coefficients of the first reception weighter 43, the second reception weighter 53 and the third reception weighter 63.

Figure 2A:
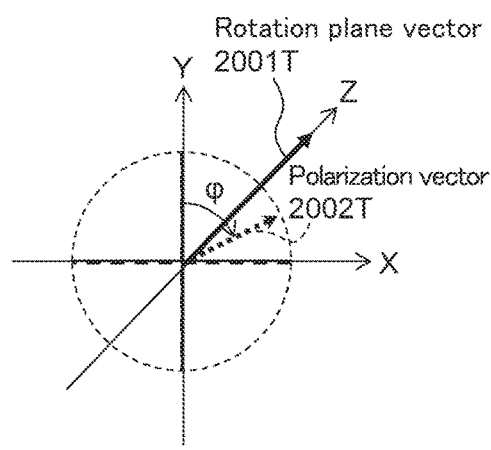
FIGS. 2A and 2B are diagrams illustrating relationship between a rotation plane vector and a polarization vector of each of a rotationally polarized wave on a transmitting side (a transmitted rotationally polarized wave) and a rotationally polarized wave on a receiving side (a received rotationally polarized wave) in the radio system according to the first embodiment of the present invention.
Figure 2B:
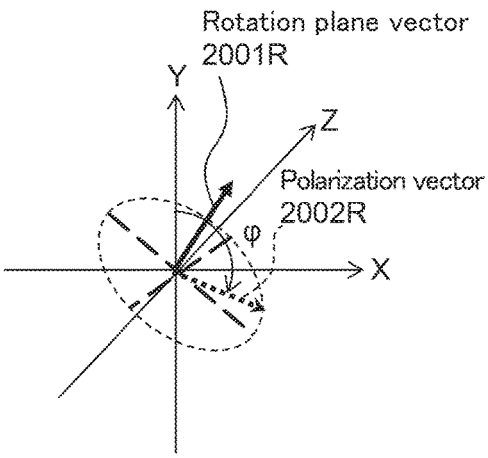

FIGS. 2A and 2B are diagrams illustrating relationship between a rotation plane vector and a polarization vector of each of a rotationally polarized wave on a transmitting side (a transmitted rotationally polarized wave) and a rotationally polarized wave on a receiving side (a received rotationally polarized wave) in the radio system according to the first embodiment of the present invention. FIG. 2A illustrates the transmitted rotationally polarized wave, and FIG. 2B illustrates the received rotationally polarized wave.

In FIGS. 2A and 2B, the X, Y, Z axes correspond to the vertical (V), normal (N) and horizontal (H) polarization directions in the first to third transmission antennas of the transmitter 100T and the first to third reception antennas of the receiver 100R.

FIG. 2A illustrates a rotation plane vector 2001T and a polarization vector 2002T of the rotationally polarized wave on the transmitting side (the transmitted rotationally polarized wave).

Meanwhile, FIG. 2B illustrates a rotation plane vector 2001R and a polarization vector 2002R of the rotationally polarized wave on the receiving side (the received rotationally polarized wave).

In FIGS. 2A and 2B, the circle and the ellipse represent rotational loci of the polarized waves, and φ represents a rotational angle of each polarization vector.

In a case where the transmitter 100T changes the transmission propagation direction to be used to transmit a rotationally polarized wave, the elliptical shape of the rotational locus of the rotationally polarized wave received by the receiver 100R accordingly changes with respect to the reception propagation direction.

Main waves (having stable signal intensity) incoming to the receiver composed of incoming reflected waves satisfy Snell's law between their transmission points and reception points, and are finite in number. Once, therefore, the reception antenna matches a reception propagation direction of a specific incoming wave, the specific incoming wave can no longer contribute to the forming of the elliptical shape of the rotational polarization, and the change in the elliptical shape of the rotational polarization with respect to this particular reception propagation direction stops.

In the baseband circuit 9 (9T, 9R) illustrated in FIG. 1, the baseband circuit 9 (9T) controls the weight coefficients of the first cosine weighter 13, the second cosine weighter 23, the third cosine weighter 33, the first sine weighter 15, the second sine weighter 25 and the third sine weighter 35, to transmit rotationally polarized waves each polarized in a three-dimensional spatial direction.

Meanwhile, the baseband circuit 9 (9R) controls the weight coefficients of the first reception weighter 43, the second reception weighter 53, and the third reception weighter 63, to detect specific reception propagation direction at which the change in the elliptical shape stops.

Once the baseband circuit 9 (9R) detects this specific reception propagation direction, the baseband circuit 9 (9T) controls the transmitter to transmit a rotationally polarized wave in this direction.

<Effects of First Embodiment>

According to the first embodiment, the radio device 100 is able to perform radio communication on the basis of a finite number of propagation paths formed between the transmission point and the reception point of the radio communication. Use of multiple radio devices according to the first embodiment of the present invention allows for the radio devices to make a choice from radio propagation paths formed between the transmission point and the reception point, which enables realization of a radio system which is robust against man-made or natural failure and interference in specific transmission paths.

Second Embodiment

Figure 3:
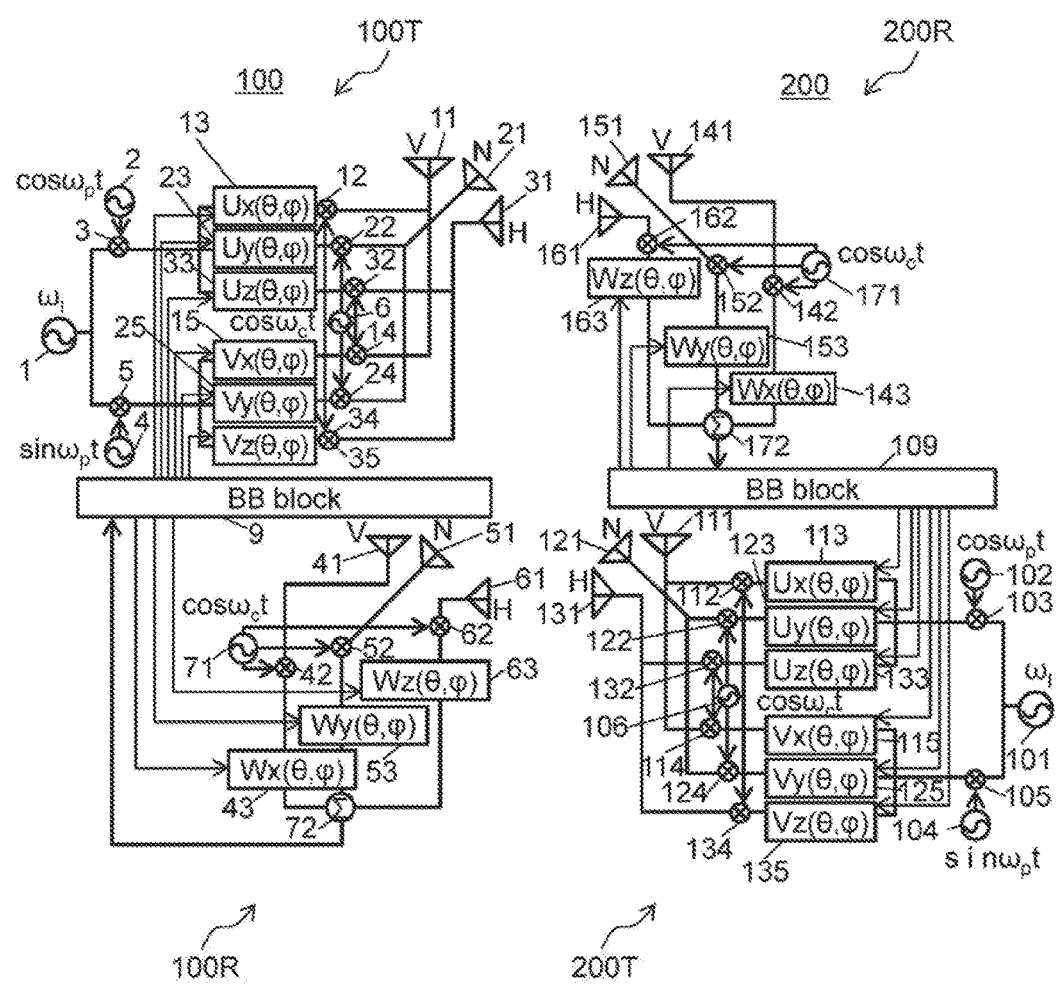
FIG. 3 is a diagram illustrating a configuration example of a radio system according to a second embodiment of the present invention in which transceivers selectively use multiple rotationally polarized wave propagation paths by using rotationally polarized waves.

Referring to FIGS. 3, 4 and 5, a description will be given of a configuration example of a radio system according to a second embodiment of the present invention, in which transceivers selectively use multiple propagation paths by using rotationally polarized waves.

FIG. 3 is a diagram illustrating a configuration example of the radio system according to the second embodiment of the present invention, in which transceivers selectively use multiple rotationally polarized wave propagation paths by using rotationally polarized waves.

In FIG. 3, a radio device 100 and a radio device 200 are paired to perform radio communication between them.

The radio device 100 includes a transmitter 100T and a receiver 100R.

The transmitter 100T and the receiver 100R in FIG. 3 are the same as the transmitter 100T and the receiver 100R in FIG. 1, and are denoted by the same reference signs. Duplicated descriptions will be omitted.

A baseband circuit 9 in FIG. 3 includes the baseband circuit 9T and the baseband circuit 9R in FIG. 1. Although the arrangement of the transmitter 100T and the receiver 100R in FIG. 3 is different from the arrangement of the transmitter 100T and the receiver 100R in FIG. 1, the functions and configurations of the transmitter 100T and the receiver 100R in FIG. 3 are the same as those of the transmitter 100T and the receiver 100R in FIG. 1.

The radio device 200 includes a transmitter 200T and a receiver 200R.

An information signal generator (cow) 101, a polarization rotation cosine oscillator (cos $\omega_p t$) 102, a polarization rotation sine oscillator (sin $\omega_p t$) 104, a first multiplier 103, a second multiplier 105 and a baseband circuit 109 included in the transmitter 200T in FIG. 3 respectively correspond to the information signal generator ($\omega_f$) 1, the polarization rotation cosine oscillator (cos $\omega_p t$) 2, the polarization rotation sine oscillator (sin $\omega_p t$) 4, the first multiplier 3, the second multiplier 5 and the baseband circuit 9 included in the transmitter 100T in FIG. 3. Although the reference signs of the components included in the transmitter 200T are different from those of the components included in the transmitter 100T, the components included in the transmitter 200T have the same functions and configurations as the components included in the transmitter 100T.

In addition, a first cosine weighter (Ux(θ, φ)) 113, a second cosine weighter (Uy(θ, φ)) 123, a third cosine weighter (Uz(θ, φ)) 133, a first sine weighter (Vx(θ, φ)) 115, a second sine weighter (Vy(θ, φ)) 125 and a third sine weighter (Vz(θ, φ)) 135 included in the transmitter 200T in FIG. 3 respectively correspond to the first cosine weighter (Ux(θ, φ)) 13, the second cosine weighter (Uy(θ, φ)) 23, the third cosine weighter (Uz(θ, φ)) 33, the first sine weighter (Vx(θ, φ)) 15, the second sine weighter (Vy(θ, φ)) 25 and the third sine weighter (Vz(θ, φ)) 35 included in the transmitter 100T in FIG. 3. Although the reference signs of the weighters included in the transmitter 200T are different from those of the weighters included in the transmitter 100T, the weighters included in the transmitter 200T have the same functions and configurations as the weighters included in the transmitter 100T.

Furthermore, a carrier frequency generator (cos $\omega_c t$) 106, a first cosine mixer 112, a second cosine mixer 122, a third cosine mixer 132, a first sine mixer 114, a second sine mixer 124 and a third sine mixer 134 included in the transmitter 200T in FIG. 3 respectively correspond to the carrier frequency generator (cos $\omega_c t$) 6, the first cosine mixer 12, the second cosine mixer 22, the third cosine mixer 32, the first sine mixer 14, the second sine mixer 24 and the third sine mixer 34 included in the transmitter 100T in FIG. 3. Although the reference signs of the carrier frequency generator, the cosine mixers and the sine mixers included in the transmitter 200T are different from those of the carrier frequency generator, the cosine mixers and the sine mixers included in the transmitter 100T, the carrier frequency generator, the cosine mixers and the sine mixers included in the transmitter 200T have the same functions and configurations as the carrier frequency generator, the cosine mixers and the sine mixers included in the transmitter 100T.

Moreover, a first transmission antenna 111, a second transmission antenna 121, and a third transmission antenna 131 included in the transmitter 200T in FIG. 3 respectively correspond to the first transmission antenna 11, the second transmission antenna 21, and the third transmission antenna 31 included in the transmitter 100T in FIG. 3. Although the reference signs of the transmission antennas included in the transmitter 200T are different from those of the transmission antennas included in the transmitter 100T, the transmission antennas included in the transmitter 200T have the same functions and configurations as the transmission antennas included in the transmitter 100T.

A first reception antenna 141, a second reception antenna 151 and a third reception antenna 161 included in the receiver 200R in FIG. 3 respectively correspond to the first reception antenna 41, the second reception antenna 51 and the third reception antenna 61 included in the receiver 100R in FIG. 3. Although the reference signs of the reception antennas included in the receiver 200R are different from those of the reception antennas included in the receiver 100R, the reception antennas in the receiver 200R have the same functions and configurations as the reception antennas in the receiver 100R.

In addition, a first reception mixer 142, a second reception mixer 152 and a third reception mixer 162 and a local oscillator (cos $\omega_c t$) 171 included in the receiver 200R in FIG. 3 respectively correspond to the first reception mixer 42, the second reception mixer 52 and the third reception mixer 62 and a local oscillator (cos $\omega_c t$) 71 included in the receiver 100R in FIG. 3. Although the reference signs of the reception mixers and the local oscillator included in the receiver 200R are different from those of the reception mixers and the local oscillator included in the receiver 100R, the reception mixers and the local oscillator included in the receiver 200R have the same functions and configurations as the reception mixers and the local oscillator included in the receiver 100R.

Furthermore, a first reception weighter (Wx($\theta$, $\varphi$)) 143, a second reception weighter (Wy($\theta$, $\varphi$)) 153, a third reception weighter (Wz($\theta$, $\varphi$)) 163, a reception combiner ($\Sigma$) 172 and a baseband circuit 109 included in the receiver 200R in FIG. 3 respectively correspond to the first reception weighter (Wx($\theta$, $\varphi$)) 43, the second reception weighter (Wy($\theta$, $\varphi$)) 53, the third reception weighter (Wz($\theta$, $\varphi$)) 63, the reception combiner ($\Sigma$) 72, and the baseband circuit 9 (9R) included in the receiver 100R in FIG. 3. Although the reference signs of the reception weighters and baseband circuit included in the receiver 200R are different from those of the components included in the receiver 100R, the reception weighters and baseband circuit included in the receiver 200R have the same functions and configurations as the reception weighters and baseband circuit included in the receiver 100R.

As described above, the transmitter 200T in FIG. 3 corresponds to the transmitter 100T in FIG. 3. Although the reference sign of the transmitter 200T is different from that of the transmitter 100T, the transmitter 200T and the transmitter 100T have the same function and configuration.

Moreover, the receiver 200R in FIG. 3 corresponds to the receiver 100R in FIG. 3. Although the reference sign of the receiver 200R is different from that of the receiver 100R, the receiver 200R and the receiver 100R have the same function and configuration.

The functions of the respective radio devices 100, 200 in FIG. 3 are the same as that of the radio device 100, which is illustrated in FIG. 1 and has been described above.

The radio devices 100, 200 in FIG. 3 are paired to perform radio communication between them.

The transmitter 100T of the radio device 100 transmits information ($\omega_I$) in multiple three-dimensional propagation directions in a time division manner, via the multiple transmission antennas 11, 21, 31, using a radio wave (rotationally polarized wave) with polarization which rotates in a frequency different from the carrier frequency ($\omega_p$).

The receiver 200R of the radio device 200 receives rotationally polarized waves incoming in multiple three-dimensional directions via the multiple reception antennas 141, 151, 161.

The receiver 200R generally detects a direction at which a change in the elliptical locus of rotational polarization stops. After this detection, the transmitter 100T makes the propagation direction for transmitting a rotationally polarized wave match the stopping direction detected by the receiver 200R, and repeats the procedure for transmitting a rotationally polarized wave.

Because of the physical characteristic of radio propagation, the repetition of the same operations by the paired radio devices (100, 200) make stopping directions converge into a specific direction.

This convergence direction is one of directions in which a finite number of radio propagation paths are formed between the transmission point and the reception point.

The radio device 100 stores this convergence direction as one radio propagation path.

Then, the transmitter 100T performs transmission in a direction spatially orthogonal to the convergence direction, to search for another one of the finite number of radio propagation paths.

The receiver 200R detects a direction at which a change in the locus of rotational polarization stops, as another radio propagation path.

The baseband circuit 9 instructs the transmitter 100T to perform transmission in the stopping direction detected by the receiver 200R, to repeat these operations to detect another reception propagation path.

By repeating the above operations, the radio system including the radio device 100 of the second embodiment is capable of identifying multiple radio propagation paths formed between the transmission point and the reception point, and thereby determining a transmission propagation direction and a reception propagation direction in which a specific radio propagation path from the radio device 100 is linked to the transceiver.

<Shift in Transmission Propagation Direction>

Referring to FIGS. 4A to 4E, a description is given of how the transmission propagation direction from the radio device 100 to the radio device 200 shifts under the above control, using antennas AT1, AR1 of the radio device 100 and antennas AT2, AR2 of the radio device 200, and following a chronological order.

It should be noted that: the antenna AT1 corresponds to the transmission antennas 11, 21, 31 in FIG. 3; the antenna AR1 corresponds to the transmission antennas 41, 51, 61 in FIG. 3; the antenna AT2 corresponds to the transmission antennas 111, 121, 131 in FIG. 3; and the antenna AR2 corresponds to the transmission antennas 141, 151, 161 in FIG. 3.

FIGS. 4A to 4E illustrate reflected waves incoming to the radio devices each including the transmitter and the receiver according to the second embodiment of the present invention, as well as radio waves radiated from the radio devices. FIGS. 4A to 4E illustrate an example of steps by which the transmitters and the receivers find desirable antenna radio wave directions in cooperation, following an order (see white arrows).

In FIGS. 4A to 4E, bold arrows represent: reflected waves incoming to the radio devices each including the transmitter and the receiver located at the origins of the coordinates; or radio waves radiated from the radio devices, which form the reflected waves.

As described above, the radio device 100 communicates with the radio device 200 having the same configuration. In a radio communication in which no wave traveling along a line of sight can be expected, a geometric-optically reflected wave satisfying Snell's law is of main interest.

The geometric-optically reflected wave is defined by positions of the transmission point and the reception point, as well as the spatial coordinates and the normal direction of a surface of an electromagnetic wave scatterer. For this reason, the bold arrows (C1 to C5, for example) indicating incoming directions of the geometric-optically reflected waves and radiating direction of waves in the steps illustrated in FIGS. 4A to 4E are fixed with respect to the two radio devices, regardless of the directions of the antennas of the radio devices which three-dimensionally change with respect to the origin of the coordinates.

Specifically, the bold arrows C1 to C5 indicating incoming directions of the geometric-optically reflected waves to the radio device 100 (the transmitter 100T and the receiver 100R) and radiating directions from the radio device 100 (the transmitter 100T and the receiver 100R) are oriented in the same directions among the steps illustrated in FIG. 4A, FIG. 4D, and FIG. 4E.

In addition, the bold arrows C1 to C5 indicating the incoming directions of the geometric-optically reflected waves to the radio device 200 (the transmitter 200T and the receiver 200R) and the radiating direction from the radio device 200 (the transmitter 200T and the receiver 200R) are oriented in the same directions between the steps illustrated in FIG. 4B and FIG. 4C.

Next, descriptions will be given of the steps illustrated in FIGS. 4A to 4E, following the chronological order.

Step illustrated in FIG. 4A. To begin with, the transmitter 100T (the transmitter of the radio device 100) sets the antenna AT1 in an arbitrary direction, and radiate an electromagnetic wave.

Step illustrated in FIG. 4B. The receiver 200R of the radio device 200 electrically changes the direction of the antenna AR2 arbitrarily to find a direction at which a change in the intensity of the received signal stops. In other words, the receiver 200R finds a direction of the antenna AR2 which makes the intensity of the received signal highest at this moment.

Incidentally, the electrical method of changing the direction of the antenna AR2 is to equivalently change the direction of the antenna AR2 by the weighting factors of the first reception weighter (Wx($\theta$, $\varphi$)) 143, the second reception weighter (Wy($\theta$, $\varphi$)) 153 and the third reception weighter (Wz($\theta$, $\varphi$)) 163 in FIG. 3. The antenna AR2 in the step illustrated in FIG. 4B, therefore, is indicated with a dashed line.

Step illustrated in FIG. 4C. The transmitter 200T of the radio device 200 sets the direction of the antenna AT2 to the direction at which the change in the intensity of the received signal stops and which is found in the step illustrated in FIG. 4B, and radiates an electromagnetic wave.

Step illustrated in FIG. 4D. The receiver 100R of the radio device 100 electrically changes the direction of the antenna AR1 to find a direction at which a change in the intensity of the received signal stops. Incidentally, the direction of the antenna AR1 is electrically changed, and the antenna AR1 in the step illustrated in FIG. 4D is indicated with a dashed line.

Step illustrated in FIG. 4E. The transmitter 100T of the radio device 100 sets the direction of the antenna AT1 to the direction found in the step illustrated in FIG. 4D, and radiates an electromagnetic wave.

Incidentally, in the step illustrated in FIG. 4A, the direction of the antenna AT1 of the receiver 100T deviates from directions C1 and C2, which are candidates of the radio propagation path. In the step illustrated in FIG. 4E, the direction of the antenna AT1 is shifting toward a convergence direction, and almost matches C1, a radio propagation path candidate.

The radio devices 100, 200 repeat the steps illustrated in FIGS. 4A to 4E.

When the directions in which to set the antennas of the radio devices 100, 200 virtually converge, the radio devices 100, 200 identify incoming directions of a finite number of geometric-optically reflected wave propagation paths to the radio devices. The radio devices 100, 200 store the incoming directions.

After the identification, the two radio devices (100, 200) set their antennas in directions which are different from the incoming directions of the identified geometric-optically reflected wave propagation paths to the radio devices, and resume radiating electromagnetic waves to find another effective propagation path. Then, the radio devices 100, 200 identify and store converged incoming directions of the another propagation path to the radio devices.

By repeating the above process, the two radio devices (100, 200) extract and store the finite number of geometric-optically reflected wave propagation paths formed between the two radio devices (100, 200), on a one-by-one basis.

The stored incoming directions are appropriately used for communication as effective propagation paths.

<Control Flow of Transmission Propagation Direction>

Next, referring to FIG. 5, a description will be given of an example of a flow for achieving the above control.

FIG. 5 is a diagram illustrating an example of a flow for controlling transmission and reception propagation directions in the radio system according to the second embodiment of the present invention.

Through the flow illustrated in FIG. 5, the two radio devices each determine the direction of a geometric-optically reflected wave propagation path, using Euler angles, $\theta$, $\varphi$, $\psi$ in a coordinate system whose origin is the location at which the radio device is installed.

Referring to and in order from steps S501 to S511, descriptions will be given of the flow in FIG. 5 for controlling the transmission propagation direction.

<<Step S501>>

Before starting a repetitive procedure of determining the direction of a geometric-optically reflected wave propagation path using Euler angles, $\theta$, $\varphi$, $\psi$, each radio device resets variables $\theta_{old}$, $\varphi_{old}$, $\psi_{old}$, which represent differences from Euler angles $\theta$, $\varphi$, $\psi$ obtained in the previous procedure, to zero.

Thereafter, the procedure proceeds to step S502.

<<Step S502>>

In step S502, the radio device sets a repetitive control variable i for identifying one geometric-optically reflected wave propagation path, at 1 (i=1).

<<Step S503>>

In step S503, the radio device sets initial values of Euler angles $\theta_i$, $\varphi_i$, $\psi_i$ to be obtained in each procedure to zero.

<<Step S504>>

In step S504, the transmitter sets the angles of the antennas for radiating a rotationally polarized electromagnetic wave using Euler angles $\theta_i$, $\varphi_i$, $\psi_i$.

<<Step S505>>

The receiver measures the electric power received by the three spatially orthogonal antennas while changing the weight factors applied to electric powers respectively received by the three spatially orthogonal antennas. The receiver finds a direction $\theta_r$, $\varphi_r$, $\psi_r$ at which the received electric power retains with respect to the rotation of a rotationally polarized wave, and substitutes the values of the found $\theta_r$, $\varphi_r$, $\psi_r$ into $\theta_i$, $\varphi_i$, $\psi_i$ for the i-th procedure.

<<Step S506>>

In step S506, differences between $\theta_i$, $\varphi_i$, $\psi_i$ and $\theta_{old}$, $\varphi_{old}$, $\psi_{old}$ are calculated.

If all the differences in Euler angles are sufficiently smaller than predetermined values (if Yes), the procedure proceeds to step S508.

On the other hand, if none of the differences in Euler angles are sufficiently smaller than the predetermined values for the respective Euler angles (if No), the procedure proceeds to step S507.

<<Step S507>>

In step S507, the values of $\theta_i$, $\varphi_i$, $\psi_i$ are substituted into $\theta_{old}$, $\varphi_{old}$, $\psi_{old}$.

Thereafter, the procedure returns to step S504.

In other words, the transmitter sets the angles of the antennas for radiating the rotationally polarized electromagnetic wave using Euler angles $\theta_i$, $\varphi_i$, $\psi_i$, and repeats the processes from step S504.

<<Step S508>>

In step S508, the values of $\theta_i$, $\varphi_i$, $\psi_i$ in step S507 are stored as one convergence direction of geometric-optically reflected wave propagation paths.

Thereafter, the procedure proceeds to step S509.

<<Step S509>>

In step S509, the control variable i is incremented by 1 (i=i+1).

Thereafter, the procedure proceeds to step S510.

<<Step S510>>

In step S510, values of Euler angles $\perp\theta$, $\perp\varphi$, $\perp\psi$ perpendicular to the direction represented by $\theta_i$, $\varphi_i$, $\psi_i$ are substituted into $\theta_i$, $\varphi_i$, $\psi_i$ as new Euler angles.

Incidentally, the reason why a direction perpendicular to the convergence direction stored in step S508 is chosen as a new direction in step S510 is that it is useful as a method of finding another radio propagation path.

Thereafter, the procedure proceeds to step S511.

<<Step S511>>

In step S511, the variables $\theta_{old}$, $\varphi_{old}$, $\psi_{old}$ are reset to zero.

Thereafter, the procedure returns to step S504.

In other words, the transmitter sets the angles of the antennas for radiating a rotationally polarized electromagnetic wave using Euler angles $\theta_i$, $\varphi_i$, $\psi_i$, and repeats the processes from step S504.

<Effects of Second Embodiment>

The second embodiment allows for two mutually-communicating radio devices included in the radio system to identify a finite number of radio propagation paths formed between the transmission point and the reception point, and to selectively use the identified radio propagation paths to communicate with each other.

The radio devices are thus capable of communicating with each other by avoiding or eliminating troubled or obstructed propagation paths.

The second embodiment, therefore, can realize a radio system and a network which are robust against man-made or natural failure and interference in specific transmission paths.

Third Embodiment

Figure 6:
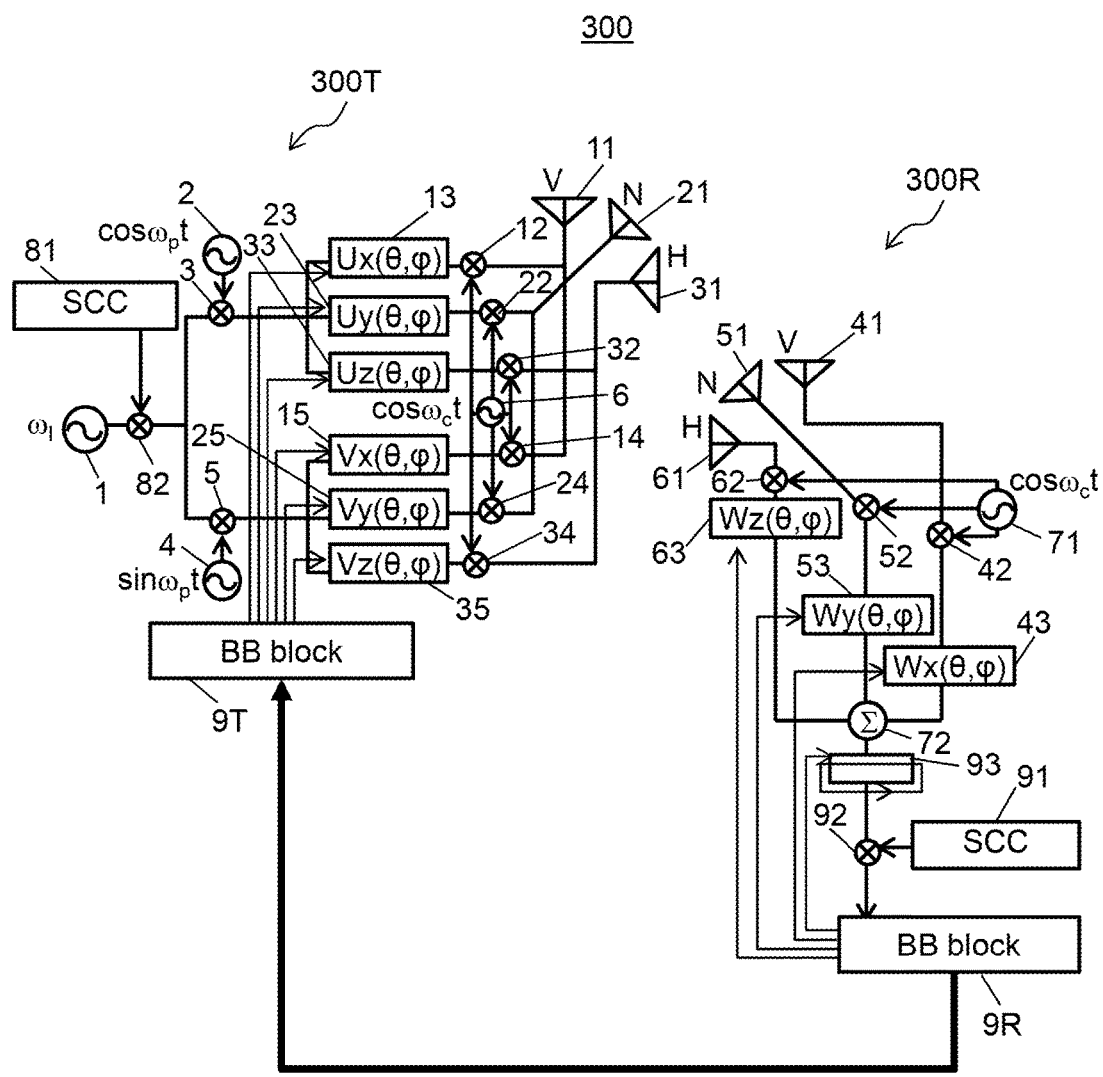
FIG. 6 is a diagram illustrating a configuration example of a radio device included in a radio system according to a third embodiment of the present invention.

Referring to FIG. 6, a description will be given of an another configuration example of a radio device included in a radio system according to a third embodiment of the present invention, in which transceivers selectively use multiple rotationally polarized wave propagation paths by using rotationally polarized waves.

FIG. 6 is a diagram illustrating a configuration example of a radio device 300 included in a radio system according to the third embodiment of the present invention.

In FIG. 6, the radio device 300 includes a transmitter 300T and a receiver 300R.

The radio device 300 shown in FIG. 6 differs from the radio device 100 shown in FIG. 1 in that: the transmitter 300T further includes a strong correlation code generator (SCC) 81 and a third multiplier 82; and the receiver 300R further includes a strong correlation code generator (SCC) 91, a fourth multiplier 92 and a circulation circuit 93.

In the transmitter 300T, an output from the information signal generator ($\omega_I$) 1 and an output from the strong correlation code generator (SCC) 81 are inputted into the third multiplier 82.

The third multiplier 82 superimposes the strong correlation code onto the information signal (applies spreading code to the information signal), and outputs a resultant signal. The output from the third multiplier 82 is branched into two output signals, one of which is passed to the first multiplier 3 and the other of which is passed to the second multiplier 5.

The rest of the configuration of the transmitter 300T in FIG. 6 is the same as that of the configuration of the transmitter 100T in FIG. 1. Duplicated descriptions are omitted.

As described above, the transmitter 300T is characterized by superimposing the strong correlation code onto the information signal. Use of, for example, an autocorrelation function or a cross-correlation function for this strong correlation code makes it possible to add a function of easily synchronizing signals in the transceiver, or a function of easily identifying signals from multiple radio devices.

Using the fourth multiplier 92, the receiver 300R correlates an output from the reception combiner 72 and an output from the strong correlation code generator (SCC) 91 while inputting the output from the reception combiner 72 into the circulation circuit 93 and causing the circulation circuit 93 to shift the timing under the control of the baseband circuit 9.

It should be noted that in FIG. 6, an arrow with a thin line circled around the circulation circuit 93 abstractly represents the above-mentioned action to "shift the timing."

The strong correlation code generator 91 in the receiver 300R uses the same code as that used by the strong correlation code generator 81 in the transmitter 300T.

The rest of the configuration of the receiver 300R in FIG. 6 is the same as that of the configuration of the receiver 100R in FIG. 1. Duplicated descriptions are omitted.

As described above, the receiver 300R performs decoding using the same strong correlation code as that used in the transmitter 300T.

As mentioned above, therefore, the use of, for example, an autocorrelation function or a cross-correlation function for this strong correlation code facilitates synchronizing signals in the transceiver, or identifying signals from the multiple radio devices.

<Effects of Third Embodiment>

According to the third embodiment, for each cycle of the rotational polarization, the transmitter 300T applies spreading code to the information signal using the strong correlation code, while the receiver 300R decodes the information signal using the same strong correlation code. The third embodiment, therefore, makes it possible to determine communication quality of a received signal corresponding to a specific transmitted polarized wave.

In other words, the third embodiment enables the transmitter to perform transmission using a polarized wave with excellent communication quality. The third embodiment, therefore, improves the radio communication quality.

Fourth Embodiment

Figure 7:
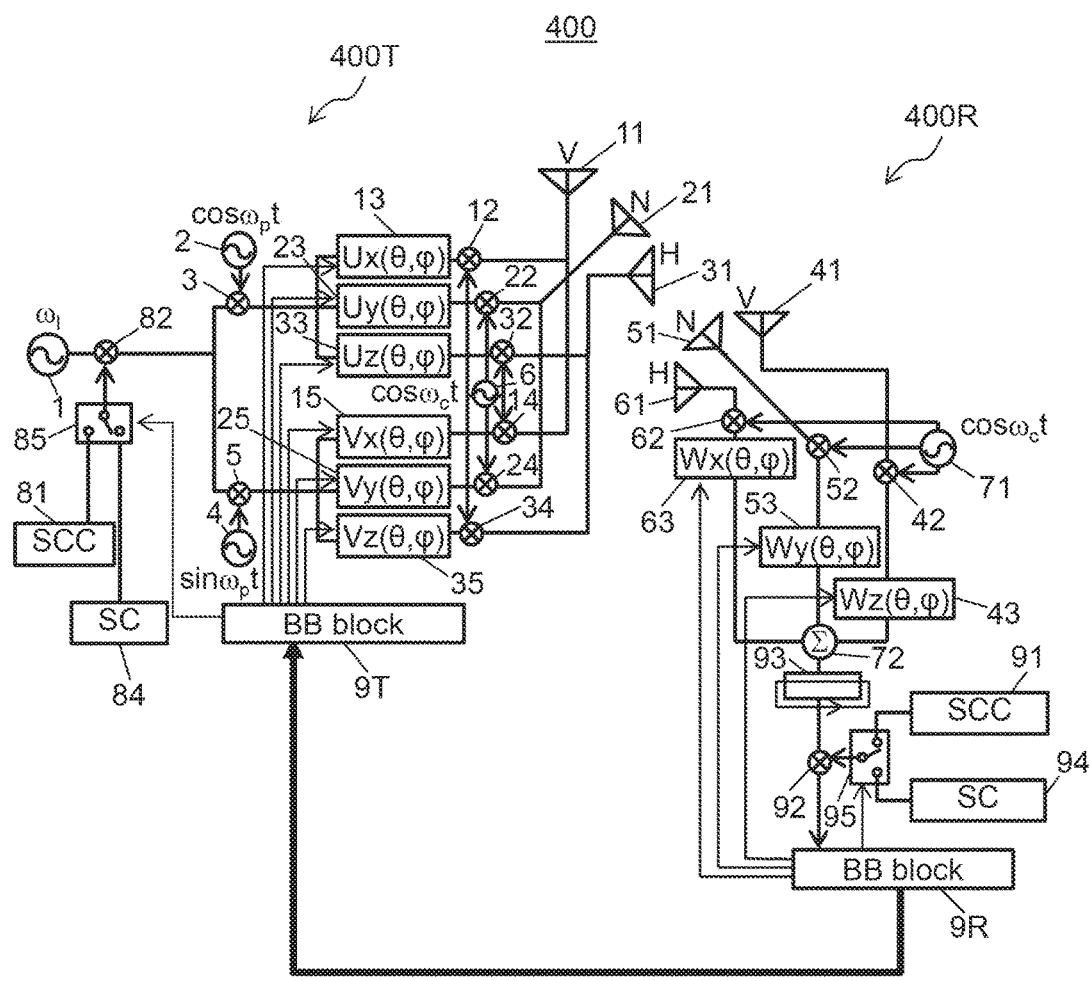
FIG. 7 is a diagram illustrating a configuration example of a radio device included in a radio system according to a fourth embodiment of the present invention.

Referring to FIG. 7, a description will be given of an another configuration example of a radio device included in a radio system according to a fourth embodiment of the present invention, in which transceivers selectively use multiple rotationally polarized wave propagation paths by using rotationally polarized waves.

FIG. 7 is a diagram illustrating a configuration example of a radio device 400 included in the radio system according to a fourth embodiment of the present invention.

In FIG. 7, the radio device 400 includes a transmitter 400T and a receiver 400R.

The radio device 400 shown in FIG. 7 differs from the radio device 300 shown in FIG. 6 in that: the transmitter 400T further includes a synchronization code generator (SC: Synchronized Code) 84 and a transmission code switcher 85; and the receiver 400R further includes a synchronization code generator (SC) 94 and a reception code switcher 95.

In the transmitter 400T, the transmission code switcher 85 temporally switches between an output from the synchronization code generator (SC) 84 and an output from the strong correlation code generator (SCC) 81. The switching operation of the transmission code switcher 85 is controlled by the baseband circuit 9 (9T).

An output from the information signal generator (cow) 1 and the one selected from the output of the synchronization code generator (SC) 84 and the output of the strong correlation code generator (SCC) 81 by the transmission code switcher 85 are inputted into, and superimposed together by, the third multiplier 82.

The rest of the configuration of the transmitter 400T in FIG. 7 is the same as that of the configuration of the transmitter 300T in FIG. 6. Duplicated descriptions are omitted.

The transmitter 400T of the fourth embodiment is characterized by: using the synchronization code generator 84 in addition to the strong correlation code generator 81; and thereby enhancing the function of synchronizing signals between the transceivers.

In the receiver 400R, the reception code switcher 95 temporally switches between an output from the synchronization code generator (SC) 94 and an output from the strong correlation code generator (SCC) 91. The switching operation of the reception code switcher 95 is controlled by the baseband circuit 9 (9R).

An output from the circulation circuit 93 and the one selected from the output of a synchronization code generator 94 and the output of the strong correlation code generator 91 by the reception code switcher 95 are inputted into the fourth multiplier 92. Thereby, the receiver 400R correlates the signal from the circulation circuit 93 and the code from the synchronization code generator 94 or the strong correlation code generator 91.

The synchronization code generator 94 in the receiver 400R uses the same code as that used by the synchronization code generator 84 in the transmitter 400T.

Furthermore, the reception code switcher 95 of the receiver 400R and the transmission code switcher 85 of the transmitter 400T switch between the synchronization code generators (84, 94) and the strong correlation code generators (81, 91) at the same timings under the control of the baseband circuit 9 (9T, 9R).

The rest of the configuration of the receiver 400R in FIG. 7 is the same as that of the configuration of the receiver 300R in FIG. 3, and duplicated descriptions will be omitted.

As described above, the receiver 400R performs the decoding using the synchronization code generator 94 which uses the same synchronized code as the synchronization code generator 94 of the transmitter 400T.

In other words, the baseband circuit 9 (9T, 9R) switches the code used by the transmitter 400T and the receiver 400R at the same timings, to the strong correlation code or the synchronization code using the transmission code switcher 85 and the reception code switcher 95. Thereby, the radio device 400 is capable of synchronizing the transmitter and the receiver using the synchronization code, at timings different from the timings at which the strong correlation code is used.

Thus, the function of synchronizing signals in the transceiver can be enhanced.

<Effects of Fourth Embodiment>

The fourth embodiment allows the transmitter and the receiver to synchronize with each other, and to thereby accurately perform time series operations in the transmission and the reception. The fourth embodiment, therefore, can improve accuracy with which to identify multiple propagation paths using rotational polarization.

In addition, the fourth embodiment can reinforce the robustness against man-made or natural failure and interference in specific transmission paths.

Fifth Embodiment

Figure 8:
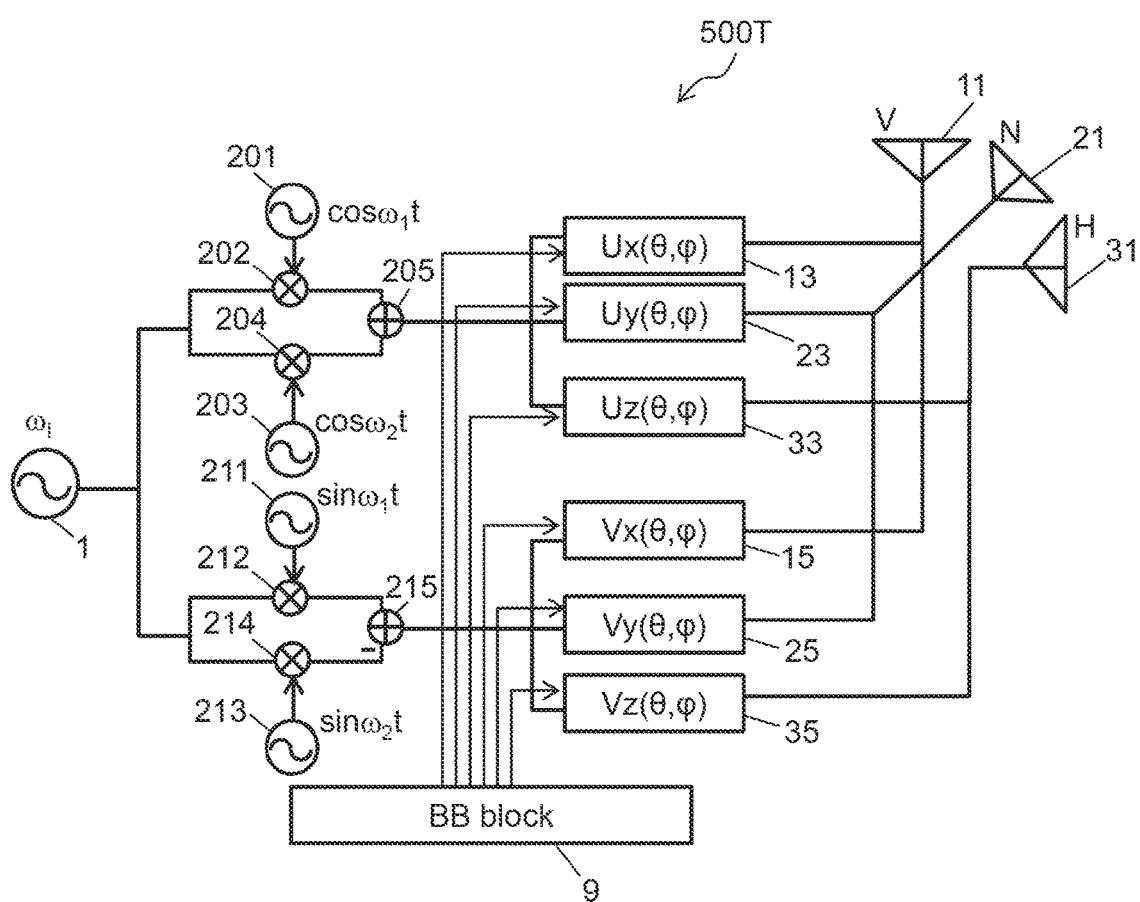
FIG. 8 is a diagram illustrating a configuration example of a transmitter included in a radio system according to a fifth embodiment of the present invention.

Referring to FIG. 8, a description will be given of an another configuration example of a transmitter of a radio device included in a radio system according to a fifth embodiment of the present invention, in which transceivers selectively use multiple rotationally polarized wave propagation paths by using rotationally polarized waves.

FIG. 8 is a diagram illustrating a configuration example of a transmitter 500T included in the radio system according to the fifth embodiment of the present invention.

The transmitter 500T includes the information signal generator ($\omega_I$) 1, a first frequency cosine generator ($\cos \omega_1 t$) 201, a second frequency cosine generator ($\cos \omega_2 t$) 203, a first frequency sine generator ($\sin \omega_1 t$) 211, a second frequency sine generator ($\sin \omega_2 t$) 213, a first multiplier 202, a second multiplier 204, a third multiplier 212, a fourth multiplier 214, an adder 205, a subtractor 215, and a baseband circuit (BB block) 9.

The transmitter 500T further includes the first cosine weighter (Ux(θ, φ)) 13, the second cosine weighter (Uy(θ, φ)) 23, the third cosine weighter (Uz(θ, φ)) 33, the first sine weighter (Vx(θ, φ)) 15, the second sine weighter (Vy(θ, φ)) 25 and the third sine weighter (Vz(θ, φ)) 35.

The transmitter 500T further includes the first transmission antenna (V) 11, the second transmission antenna (N) 21 and the third transmission antenna (H) 31.

In the transmitter 500T, the information signal generator 1 generates or produces information signal of the transmitter.

An output from the information signal generator 1 is branched into two output signals. One of the two output signals is further branched into two halves, which are respectively passed to the first multiplier 202 and the second multiplier 204. The other of the two output signals is further branched into two halves, which are respectively passed to the third multiplier 212 and the fourth multiplier 214.

The first multiplier 202 superimposes the output from the information signal generator ($\omega_I$) 1 on an output from the first frequency cosine generator (cos $\omega_1$t) 201.

The second multiplier 204 superimposes the output from the information signal generator ($\omega_I$) 1 on an output from the second frequency cosine generator (cos $\omega_2$t) 203.

The third multiplier 212 superimposes the output from the information signal generator ($\omega_I$) 1 on an output from the first frequency sine generator (sin $\omega_1$t) 211.

The fourth multiplier 214 superimposes the output from the information signal generator ($\omega_I$) 1 on an output from the second frequency sine generator (sin $\omega_2$t) 213.

The adder 205 adds up an output from the first multiplier 202 and an output from the second multiplier 204.

The subtractor 215 performs subtraction between an output of the third multiplier 212 and an output of the fourth multiplier 214.

An output of the adder 205 is branched into three output signals, which are respectively passed to the first cosine weighter (Ux(θ, φ)) 13, the second cosine weighter (Uy(θ, φ)) 23 and the third cosine weighter (Uz(θ, φ)) 33.

An output from the subtractor 215 is branched into three output signals, which are respectively passed to the first sine weighter (Vx(θ, φ)) 15, the second sine weighter (Vy(θ, φ)) 25, and the third sine weighter (Vz(θ, φ)) 35.

The first cosine weighter 13, the second cosine weighter 23, and the third cosine weighter 33, the first sine weighter 15, the second sine weighter 25, and the third sine weighter 35 are controlled by the baseband circuit (BB block) 9.

An output from the first cosine weighter (Ux(θ, φ)) 13 and an output from the first sine weighter (Vx(θ, φ)) 15 are inputted into the first transmission antenna (V) 11.

An output from the second cosine weighter (Uy(θ, φ)) 23 and an output from the second sine weighter (Vy(θ, φ)) 25 are inputted into the second transmission antenna (N) 21.

An output from the third cosine weighter (Uz(θ, φ)) 33 and an output from the third sine weighter (Vz(θ, φ)) 35 are inputted into the third transmission antenna (H) 31.

The first transmission antenna 11, the second transmission antenna 21 and the third transmission antenna 31 are polarized antennas for transmitting a polarized electromagnetic wave, and are arranged spatially orthogonal to one another.

The electrical signal inputted into the first transmission antenna (V) 11 is converted into a radio wave (electromagnetic wave) radiated into space in a vertical direction.

The electrical signal inputted into the second transmission antenna (N) 21 is converted into a radio wave (electromagnetic wave) radiated into space in a normal direction.

The electrical signal inputted into the third transmission antenna (H) 31 is converted into a radio wave (electromagnetic wave) radiated into space in a horizontal direction.

The transmitter 500T thus configured can output rotationally polarized waves and have a function similar to that of the transmitter 100T of the radio device 100 according to the first embodiment illustrated in FIG. 1. The transmitter 500T shown in FIG. 5 uses none of the mixers (12, 22, 32, 14, 24, 34: FIG. 1) in the transmitter 100T in FIG. 1.

In the foregoing configuration, the adder 205 adds up cos $\omega_1$t and cos $\omega_2$t each functioning as a carrier. In addition, the subtractor 215 performs subtraction between sin $\omega_1$t and sin $\omega_2$t each functioning as a carrier.

A radio wave obtained by adding the carriers and a radio wave obtained by performing subtraction between the carriers are different from each other in the rotational direction of the polarization in the space.

Specifically, the addition results in outputting a so-called clockwise circular polarization (rotational polarization), whereas the subtraction results in outputting a so-called counterclockwise circular polarization (rotational polarization). A polarization obtained by combining the clockwise polarization and the counterclockwise polarization rotates slowly. This slow rotation makes it possible for the receiving side to detect the radio wave easily.

In this case, the rotation frequency of the polarization (rotational polarization) is smaller than that of the carrier wave of the radio wave.

<Effects of Fifth Embodiment>

The fifth embodiment can eliminate the mixers (12, 22, 32, 14, 24, 34: FIG. 1) compared with the transmitter 100T of the radio device 100 of the first embodiment illustrated in FIG. 1.

Furthermore, the fifth embodiment is not only effective for a reduction in the size of the device because of the elimination of the mixers, but also can inhibit deterioration in the device with time and temperature.

Moreover, the fifth embodiment allow the receiving side to detect a radio wave easily.

Sixth Embodiment

Figure 9:
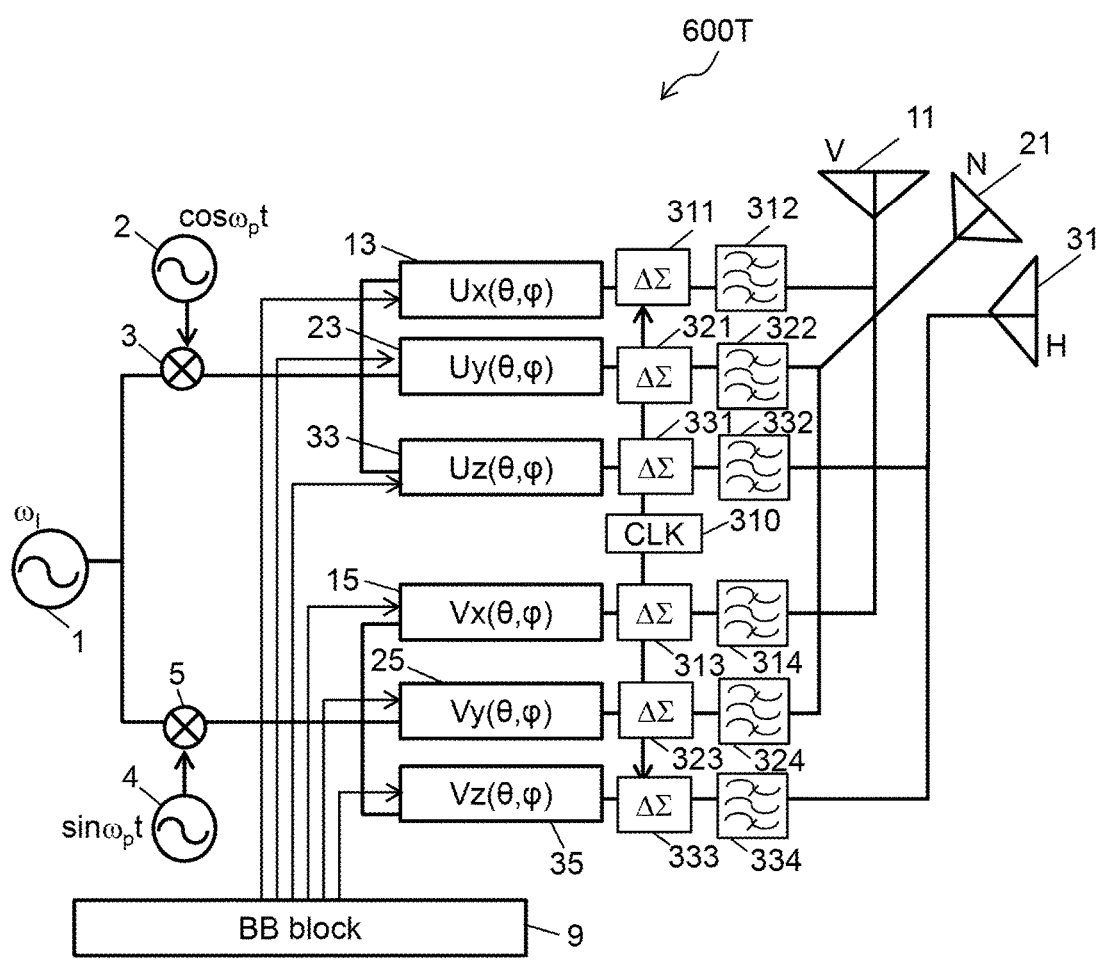
FIG. 9 is a diagram illustrating a configuration example of a transmitter included in a radio system according to a sixth embodiment of the present invention.

Referring to FIG. 9, a description will be given of an another configuration example of a transmitter of a radio device included in a radio system according to a sixth embodiment of the present invention, in which transceivers selectively use multiple rotationally polarized wave propagation paths by using rotationally polarized waves.

FIG. 9 is a diagram illustrating a configuration example of a transmitter 600T included in the radio system according to the sixth embodiment of the present invention.

What makes the transmitter 600T of the sixth embodiment in FIG. 9 different from the transmitter 100T of the first embodiment in FIG. 1 is a circuit configuration in between the first to third cosine weighters (13, 23, 33) and the first to third antennas (11, 21, 31), and a circuit configuration in between the first to third sine weighters (15, 25, 35) and the first to third antennas (11, 21, 31).

In the transmitter 600T of the sixth embodiment in FIG. 9, the first cosine mixer 12, the second cosine mixer 22, the third cosine mixer 32, the first sine mixer 14, the second sine mixer 24 and the third sine mixer 34, which are connected to the carrier frequency generator 6 in the transmitter 100T of the first embodiment in FIG. 1, are eliminated.

Instead of these circuits, the transmitter 600T of the sixth embodiment in FIG. 9 includes a clock generating circuit (CLK) 310, a cascade connection of a first cosine delta-sigma modulator (ΔΣ) 311 and a first cosine filter 312, a cascade connection of a second cosine delta-sigma modulator (ΔΣ) 321 and a second cosine filter 322, as well as a cascade connection of a third cosine delta-sigma modulator (ΔΣ) 331 and a third cosine filter 332.

Moreover, the transmitter 600T uses a cascade connection of a first sine delta-sigma modulator (ΔΣ) 313 and a first sine filter 314, a cascade connection of a second sine delta-sigma modulator (ΔΣ) 323 and a second sine filter 324, as well as a cascade connection of a third sine delta-sigma modulator (ΔΣ) 333 and a third sine filter 334.

Incidentally, the first to third cosine delta-sigma modulators (ΔΣ) 311, 321, 331 and the first to third sine delta-sigma modulators (ΔΣ) 313, 323, 333 operate depending on the clock generating circuit (CLK) 310.

None of these circuits exist in the transmitter 100T of the first embodiment in FIG. 1.

The above-described circuit configuration in the transmitter 600T illustrated in FIG. 9 is obtained by: removing the cosine mixers and the sine mixers, which are analog circuits, from the transmitter 100T in FIG. 1; and, in place of them, providing the cosine delta-sigma modulators, the sine delta-sigma modulators, the cosine filters and the sine filters.

The transmitter 600T illustrated in FIG. 9, therefore, has the same function as the transmitter 100T in FIG. 1 from a viewpoint of a transmitter in the radio system which selectively uses multiple rotationally polarized wave propagation paths by use of rotationally polarized waves.

The transmitter 600T illustrated in FIG. 9 is constituted by digital circuits, except for the antennas (11, 21, 31).

<Effects of Sixth Embodiment>

According to the sixth embodiment, the transmitter is comprised of digital circuits.

The sixth embodiment, therefore, is effective for a reduction in the size of the device, an extension of the life of the device, and elimination of adjustments to the device.

Seventh Embodiment

Figure 10:
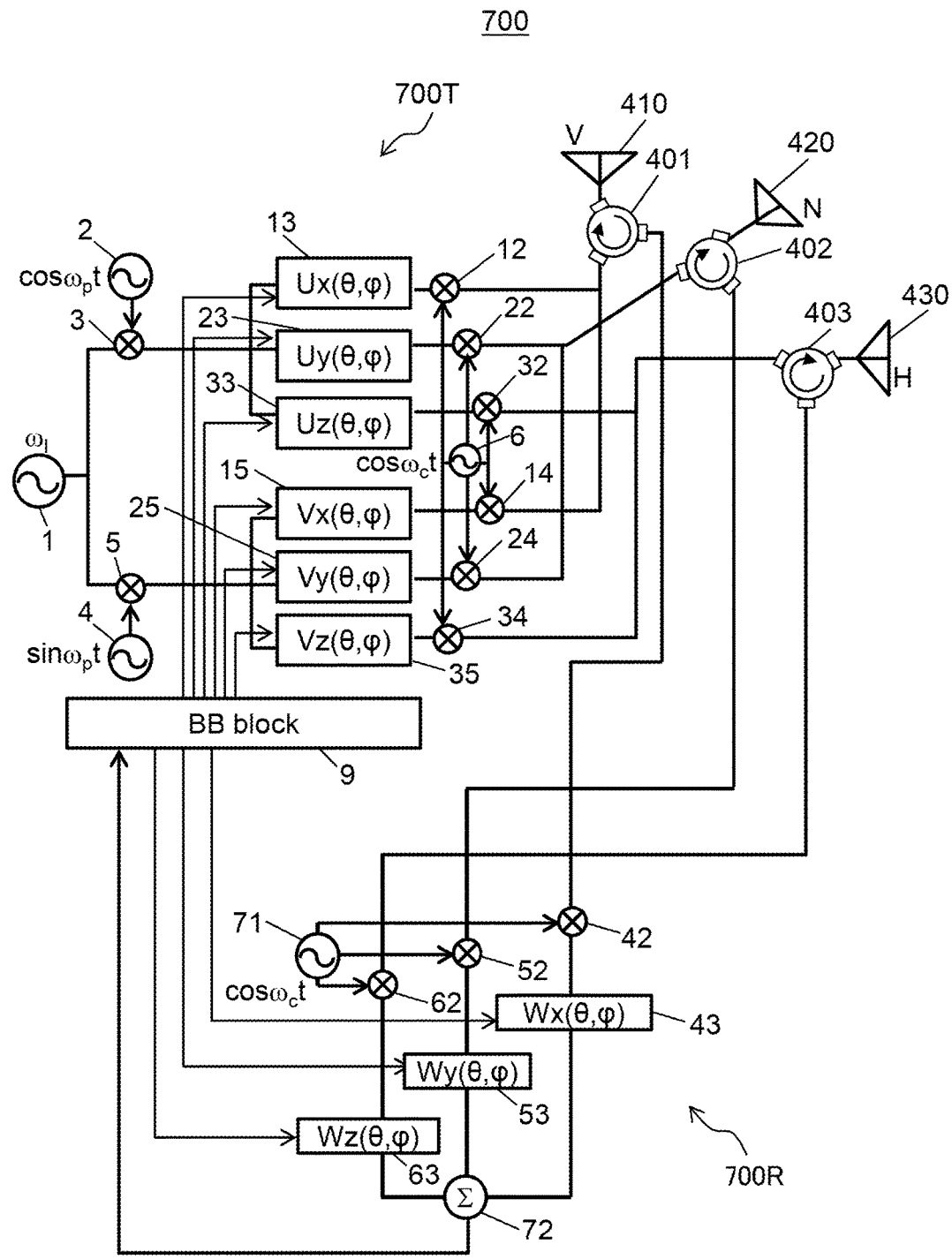
FIG. 10 is a diagram illustrating a configuration example of a radio device included in a radio system according to a seventh embodiment of the present invention.

Referring to FIG. 10, a description will be given of an another configuration example of a radio device included in a radio system according to a seventh embodiment of the present invention, in which transceivers selectively use multiple rotationally polarized wave propagation paths by using rotationally polarized waves.

FIG. 10 is a diagram illustrating a configuration example of a radio device 700 included in the radio system according to the seventh embodiment of the present invention.

The radio device 700 of the seventh embodiment in FIG. 10 differs from the radio device 100 of the first embodiment in FIG. 1 in that the radio device 700 further includes a first circulator 401, a second circulator 402 and a third circulator 403.

In addition, the radio device 700 differs from the radio device 100 in that the radio device 700 further includes a first transmission and reception antenna (V) 410, a second transmission and reception antenna (N) 420 and a third transmission and reception antenna (H) 430. The first to third transmission and reception antennas 410, 420 430 are each a dual-purpose antenna designed to perform transmission and reception.

The first to third transmission antennas (11, 21, 31) of the transmitter 100T of the first embodiment in FIG. 1 and the first to third reception antennas (41, 51, 61) of the receiver 100R of the first embodiment in FIG. 1 are removed from FIG. 10 in exchange for the providing of these transmission and reception antennas.

In FIG. 10, terminals of the first to third transmission and reception antennas 410, 420, 430 are connected to first ports of the first to third circulators 401, 402, 403, respectively.

In addition, an output of the first cosine mixer 12 and an output of the first sine mixer 14 are connected to a second port of the first circulator 401, while an input of the first reception mixer 42 is connected to a third port of the first circulator 401.

Furthermore, an output of the second cosine mixer 22 and an output of the second sine mixer 24 are connected to a second port of the second circulator 402, while an input of the second reception mixer 52 is connected to a third port of the second circulator 402.

Moreover, an output of the third cosine mixer 32 and an output of the third sine mixer 34 are connected to a second port of the third circulator 403, while an input of the third reception mixer 62 is connected to a third port of the third circulator 403.

The radio device 700 of the seventh embodiment differs from the radio device 100 of the first embodiment in FIG. 1 in that, as described above, the radio device 700 further includes the circulators (401, 402, 403) and the transmission and reception antennas (410, 420, 430) in the circuit in FIG. 10.

In addition, the combination of the circulators (401, 402, 403) and the transmission and reception antennas (410, 420, 430) in the circuit in FIG. 10 has the same function as the combination of the transmission antennas (11, 21, 31) and the reception antennas (41, 51, 61) in FIG. 1.

The radio device 700 illustrated in FIG. 10, therefore, has the same function as the radio device 100 in FIG. 1 from a viewpoint of a transmitter in the radio system which selectively uses multiple rotationally polarized wave propagation paths by use of rotationally polarized waves.

<Effects of Seventh Embodiment>

According to the seventh embodiment, the number of antennas of the radio device is decreased. The seventh embodiment, therefore, makes it possible to reduce the size of the device, and to improve the toughness of the device against an impact from the outside.

Eighth Embodiment

Figure 11:
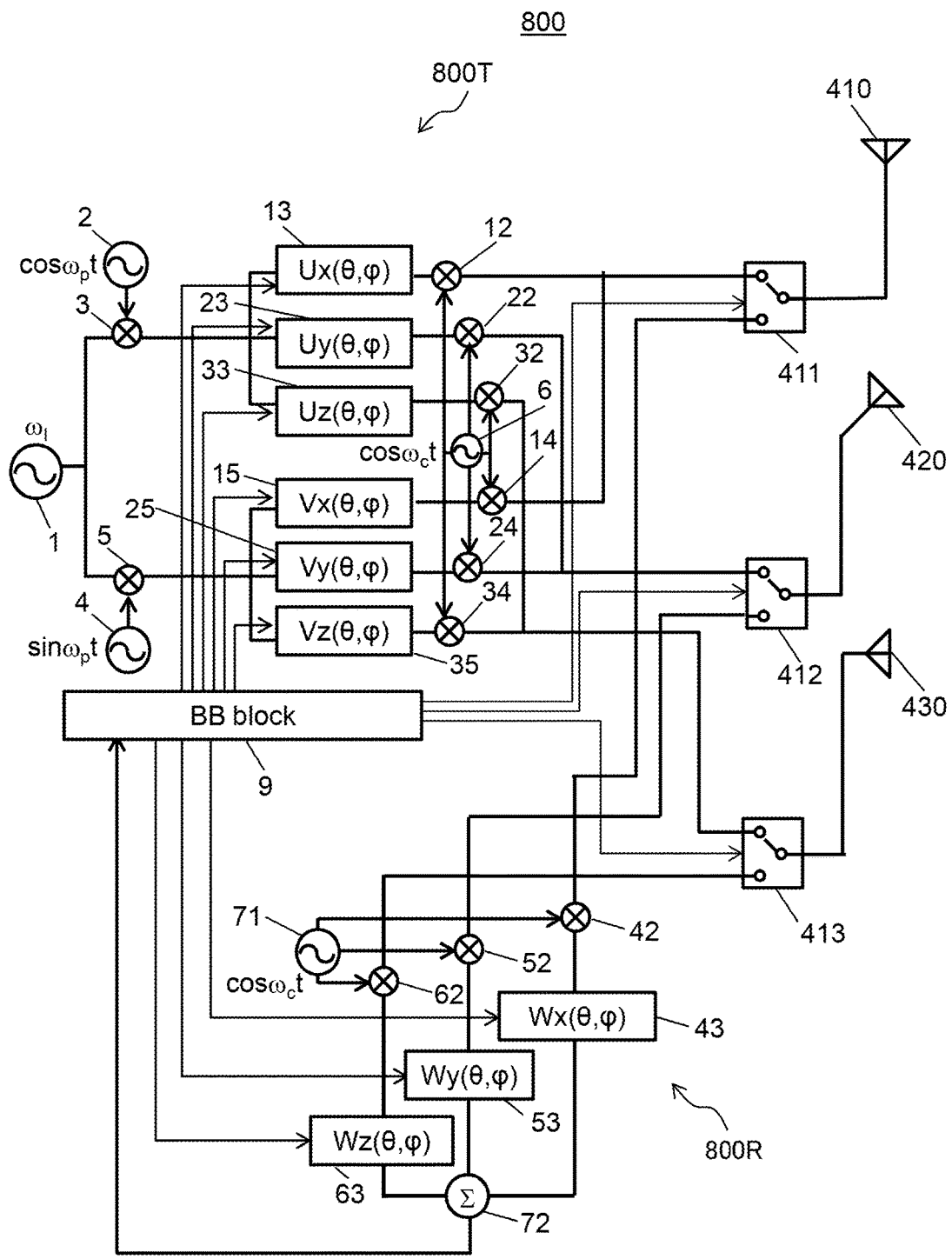
FIG. 11 is a diagram illustrating a configuration example of a radio device included in a radio system according to an eighth embodiment of the present invention.

Referring to FIG. 11, a description will be given of an another configuration example of a radio device included in a radio system according to an eighth embodiment of the present invention, in which transceivers selectively use multiple rotationally polarized wave propagation paths by using rotationally polarized waves.

FIG. 11 is a diagram illustrating a configuration example of a radio device 800 included in the radio system according to the eighth embodiment of the present invention.

The radio device 800 of the eighth embodiment in FIG. 11 differs from the radio device 700 of the seventh embodiment in FIG. 10 in that the radio device 800 includes a first transmission/reception changeover switch 411, a second transmission/reception changeover switch 412 and a third transmission/reception changeover switch 413 instead of the first to third circulators 401, 402, 403 in FIG. 10.

The first transmission/reception changeover switch 411, the second transmission/reception changeover switch 412 and the third transmission/reception changeover switch 413 are controlled by the baseband circuit 9.

The baseband circuit 9 makes the transmission and reception antennas (410, 420, 430) each function as a transmission antenna or a reception antenna, by staggering the transmitting timing and the receiving timing of the first to third transmission/reception changeover switches (411, 412, 413).

The control of the first to third transmission/reception changeover switches (411, 412, 413) by the baseband circuit 9 in the radio device 800 of the eight embodiment in FIG. 11 enables the first to third transmission/reception changeover switches (411, 412, 413) to perform the same functions as the first to third circulators (401, 402, 403) in the radio device 700 of the seventh embodiment illustrated in FIG. 10.

Duplicated descriptions for the rest of the configuration of the radio device 800 will be omitted.

<Effects of Eighth Embodiment>

The eighth embodiment makes it possible to reduce the number of antennas without using the circulators which are, generally speaking, large in volume and expensive. The eighth embodiment, therefore, makes it possible to reduce the size of the device and costs compared to the seventh embodiment in FIG. 10.

It should be noted that in the case of a radio communication which uses mainly reflected waves because no direct waves can be expected, the usable frequency is limited to one within a frequency range in the order of several hundred MHz. To handle this frequency range, circulators in the conventional technique are as large in size as several centimeters to tens of centimeters in each side. In contrast, the transmission/reception changeover switches (411 to 413) of the eighth embodiment are each a semiconductor chip whose size is equal to or less than several millimeters in each side.

The radio device using the transmission/reception changeover switches (411 to 413) of the eighth embodiment, therefore, is highly effective for reductions in size and costs.

Ninth Embodiment: Elevator Control System

A description will be given of a configuration example of an elevator control system 1100 according to a ninth embodiment of the present invention, to which a radio system that controls polarization using multiple frequencies is applied.

Figure 12:
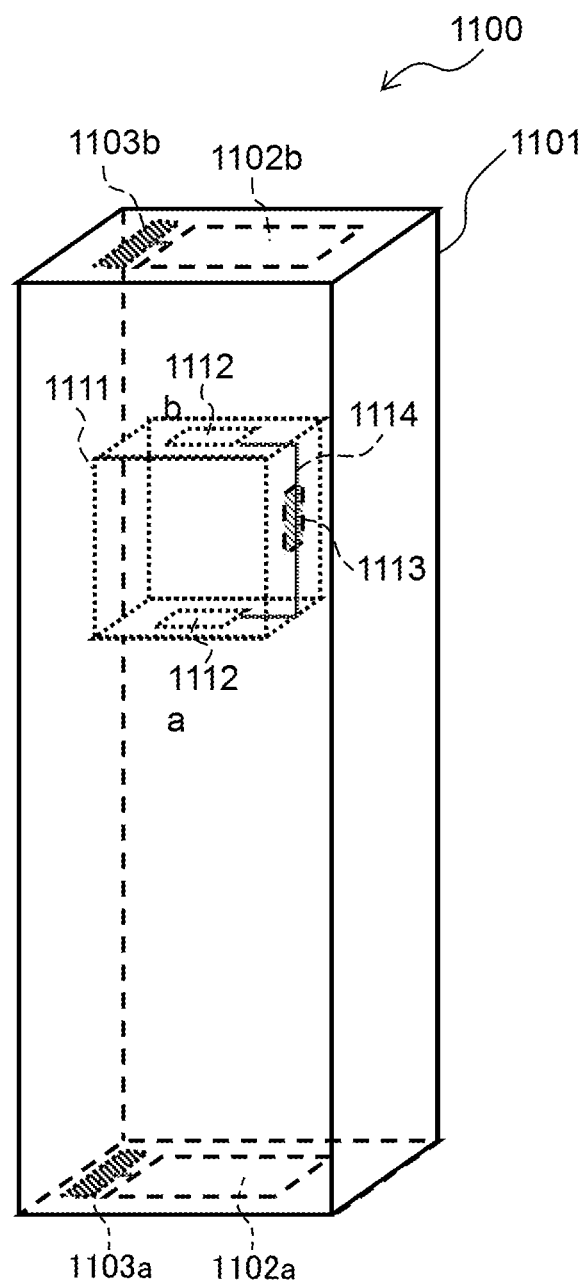
FIG. 12 is a diagram illustrating a configuration example of an elevator control system according to a ninth embodiment of the present invention.

FIG. 12 is a diagram illustrating a configuration example of the elevator control system 1100 according to the ninth embodiment of the present invention.

The elevator control system 1100 according to this (ninth) embodiment illustrated in FIG. 12 is such that: an elevator is installed in a building 1101; and an elevator car 1111 goes up and down inside the building 1101.

A base station radio device 1103a and a base station orthogonally polarized integrated antenna 1102a are installed in a floor inside the building 1101, and are connected to each other.

The base station radio device 1103a and the base station orthogonally polarized integrated antenna 1102a include a transmitter and a receiver having antennas capable of transmitting and receiving polarized waves as described in the description of any one of the first to eighth embodiments.

The base station radio device 1103a produces a signal and transmits it via the base station orthogonally polarized integrated antenna 1102a.

It should be noted that the orthogonally polarized integrated antenna is an integrated antenna obtained by combining multiple antennas arranged such that the radio wave generations via the multiple antennas are spatially orthogonal to one another, which have been described in the first embodiment or other embodiments.

The first to eighth embodiments have cited examples of the three antennas which are orthogonal to one another in the three-dimensional (X-axis, Y-axis and Z-axis) space defined by the vertical direction (V), the normal direction (N) and the horizontal direction (H). Antennas to be combined into the integrated antenna do not have to be limited to the three antennas spatially orthogonal to one another in the three-dimensional space.

Even two antennas orthogonal to each other in the two-dimensional (X-axis and Y-axis) are effective.

In other words, the base station orthogonally polarized integrated antenna 1102a is constituted by multiple mutually-orthogonal antennas (for example, the first transmission antenna 11, the second transmission antenna 21 and the third transmission antenna 31: FIG. 1).

A base station radio device 1103b and a base station orthogonally polarized integrated antenna 1102b are installed in a ceiling inside the building 1101, and are connected to each other.

The base station radio device 1103b and the base station orthogonally polarized integrated antenna 1102b include the transmitter and the receiver having antennas capable of transmitting and receiving polarized waves as described in the description of any one of the first to eighth embodiments.

A terminal station orthogonally polarized integrated antenna 1112a is installed in an external floor of the elevator car 1111.

The terminal station orthogonally polarized integrated antenna 1112a includes a transmitter and a receiver having antennas capable of transmitting and receiving polarized waves as described in the description of any one of the first to eighth embodiments.

A terminal station orthogonally polarized integrated antenna 1112b is installed in an external ceiling of the elevator car 1111.

The terminal station orthogonally polarized integrated antenna 1112b includes a transmitter and a receiver having antennas capable of transmitting and receiving polarized waves as described in the description of any one of the first to eighth embodiments.

The terminal station orthogonally polarized integrated antenna 1112a and the terminal station orthogonally polarized integrated antenna 1112b are connected to a terminal station radio device 1113 with a high-frequency cable 1114.

The terminal station orthogonally polarized integrated antennas 1112a, 1112b are each constituted by multiple mutually-orthogonal antennas (for example, the first reception antenna 41, the second reception antenna 51 and the third reception antenna 61: FIG. 1).

The base station radio devices 1103a, 1103b and terminal station radio device 1113 use the inside of the building 1101 as a radio transmission medium. Thus, inner walls of the building 1101 and outer walls of the elevator car 1111 present a multi-path interference environment in which electromagnetic waves are subjected to multiple reflections.

The elevator control system 1100 according to this (ninth) embodiment uses the radio system (radio communication system) according to any one of the first to eighth embodiments.

The elevator control system 1100, therefore, can achieve high-quality radio transmission by: detecting whether a third party tampers with propagation paths, under a multi-path interference environment; and compensating for deterioration in quality of communications between transmission points and the reception points which is caused by the tampering.

<Effects of Ninth Embodiment>

The ninth embodiment can realize high-quality radio transmission by: detecting whether a third party tampers with propagation paths, under a multi-path interference environment; and compensating for deterioration in quality of communications between transmission points and reception points which is caused by the tampering.

The ninth embodiment also makes it possible for the elevator control system 1100 to remotely control and monitor the elevator car 1111 in the building 1101 by use of the wireless connection means using the above-described radio communication system, instead of by use of wired connection means.

The ninth embodiment, therefore, can eliminate wired connection means such as cables.

Thus, the ninth embodiment can achieve the same transport capacity with a smaller building volume. Alternatively, the ninth embodiment can achieve an increase in the transport capacity by enlarging the dimensions of the elevator with the same building volume.

Tenth Embodiment: Substation Facility Monitoring System

A description will be given of a configuration example of a substation facility monitoring system 1200 according to a tenth embodiment of the present invention, to which a radio system that controls polarization using multiple frequencies is applied.

Figure 13:
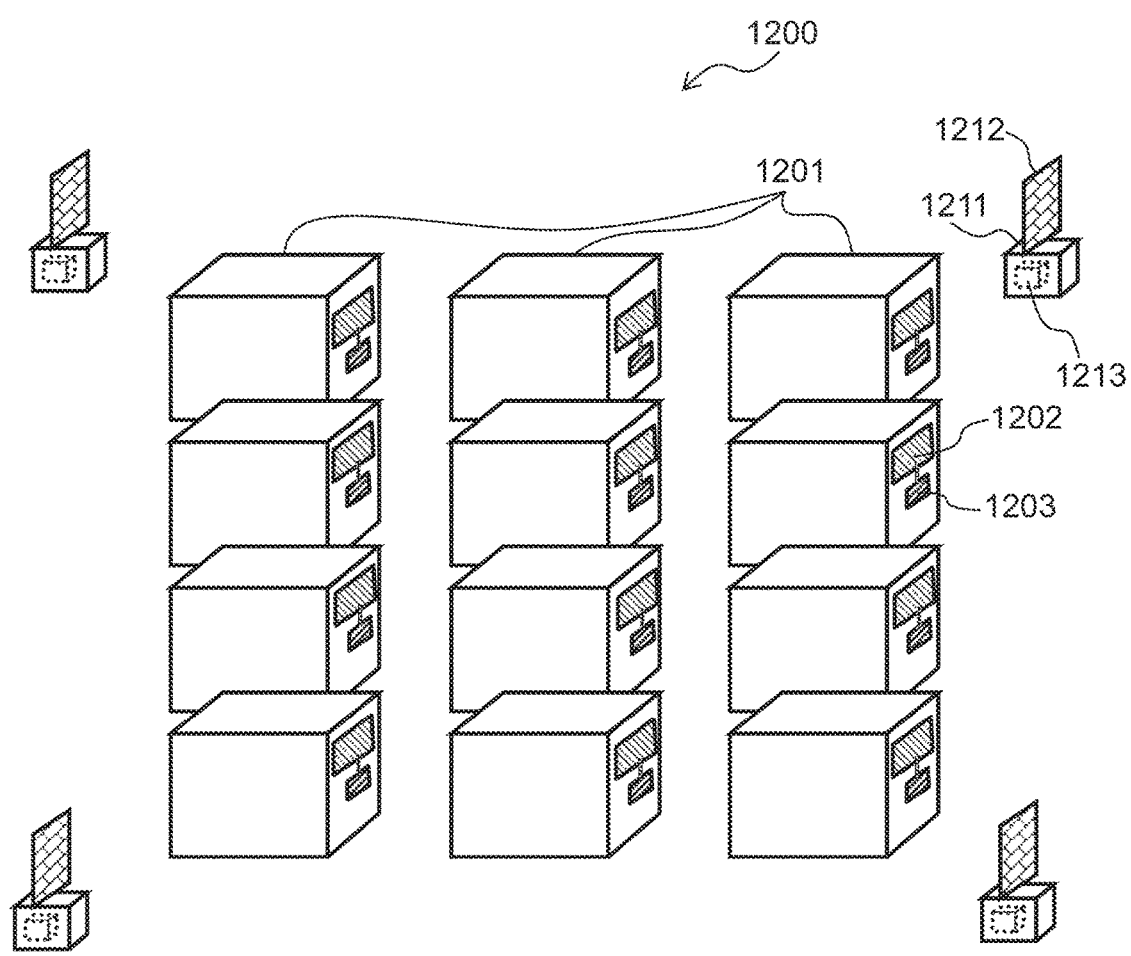
FIG. 13 is a diagram illustrating a configuration example of a substation facility monitoring system according to a tenth embodiment of the present invention.

FIG. 13 is a diagram illustrating a configuration example of the substation facility monitoring system 1200 according to the tenth embodiment of the present invention.

In FIG. 13, the substation facility monitoring system 1200 according to this (tenth) embodiment uses multiple substation apparatuses 1201 as well as the radio system (radio communication system) of any one of the first to eighth embodiments or a radio system using rotationally polarized waves.

Each terminal station radio device 1203 includes a transmitter and a receiver of the radio system using rotationally polarized electromagnetic waves.

Each terminal station radio device 1203 is installed connected with a terminal station rotationally polarized antenna 1202 constituted by an orthogonally polarized integrated antenna (rotationally polarized antenna). Furthermore, base station apparatuses 1211 are installed near the multiple substation apparatuses 1201.

The number of base station apparatuses 1211 is smaller than the number of substation apparatuses 1201.

Each base station radio device 1213 includes the transmitter and the receiver of the radio system using rotationally polarized electromagnetic waves.

Each base station radio device 1213 is installed connected with a base station rotationally polarized antenna 1212 constituted by an orthogonally polarized integrated antenna (rotationally polarized antenna).

The base station radio device 1213 produces a signal and transmits it vie the base station rotationally polarized antenna 1212.

It should be noted that, as the rotationally polarized antenna is described as an orthogonally polarized integrated antenna, the polarized antenna is an integrated antenna obtained by combining multiple antennas arranged such that the radio wave generations via the multiple antennas are spatially orthogonal to one another, which have been described in the first embodiment or other embodiments.

The first to eighth embodiments have cited examples of the three antennas which are orthogonal to one another in the three-dimensional (X-axis, Y-axis and Z-axis) space defined by the vertical direction (V), the normal direction (N) and the horizontal direction (H). Antennas to be combined into the integrated antenna do not have to be limited to the three antennas orthogonal to one another in the three-dimensional space.

Even two antennas orthogonal to each other in the two-dimensional (X-axis and Y-axis) are effective.

As described above, the terminal station radio device 1203 and the base station radio device 1213 each include the transmitter and the receiver of the radio system (radio communication system) which has antennas capable of transmitting and receiving rotationally polarized waves and which uses rotationally polarized electromagnetic waves.

The terminal station radio device 1203 and the base station radio device 1213, therefore, are capable of performing radio communications between them using the rotationally polarized electromagnetic waves.

In FIG. 13, the substation facility monitoring system 1200 includes multiple substation apparatuses 1201, multiple base station apparatuses 1211, multiple base station rotationally polarized antennas 1212, and multiple base station radio devices 1213.

Only representative ones are denoted by reference sings, while reference signs are omitted from the others having the same configurations.

The substation apparatuses 1201 each have external dimensions of the order of several meters, which are significantly larger than the wavelengths corresponding to the frequencies of the electromagnetic waves used by the radio devices, which range from several hundred MHz to several GHz. Thus, substation apparatuses 1201 present a multi-path interference environment in which electromagnetic waves are subjected to multiple reflections.

The substation facility monitoring system 1200 according to this (tenth) embodiment employs the radio system (radio communication system) according to any one of the first to eighth embodiments. The substation facility monitoring system 1200, therefore, is capable of achieving high-quality radio transmission which compensates for deterioration in quality of communications between transmission points and reception points, by use of multiple reflected waves under the multi-path interference environment.

<Effects of Tenth Embodiment>

The tenth embodiment enables the substation facility monitoring system 1200 to, as described, achieve high-quality radio transmission which compensates for deterioration in quality of communications between the transmission and the reception, by use of multiple reflected waves under the multi-path interference environment. The tenth embodiment, therefore, makes it possible for the base station apparatuses 1211 of the multiple radio base stations to remotely control and monitor the substation apparatuses 1201 by use of the wireless connection means using the above-described radio devices (transmitters, receivers), instead of by use of wired connection means. In addition, the base station apparatuses 1211 can detect failure in the substation apparatuses 1201.

The tenth embodiment can thus eliminates problems due to high-voltage induction power that may occur when wired connecting means such as cables are used, and eliminates the cost of laying such cables.

The tenth embodiment is accordingly effective to: improve the safety of the controlling and monitoring system (substation facility monitoring system) for the substation apparatuses 1201, and to reduce costs.

Other Embodiments

It should be noted that the present invention is not limited to the foregoing embodiments, and further includes various modifications. For example, the foregoing embodiments have been described in detail for the purpose of making the invention easy to understand. The invention does not have to be limited to what include all the described configurations. Furthermore, part of the configuration of one embodiment may be replaced by with part of the configuration of another embodiment. Alternatively, part or all of the configuration of one embodiment may be added to, removed from and/or replaced with the configuration of another embodiment.

Descriptions will be hereinbelow provided for other embodiments and modifications.

<<Radio System using Two Orthogonally Polarized Waves>>

The radio system of the first Embodiment illustrated in FIG. 1 has been described as performing radio communications using the polarized waves orthogonal to one another in the three-dimensional space.

The transmitter 100T, therefore, includes the three antennas, that is to say, the first transmission antenna (V) 11, the second transmission antenna (N) 21 and the third transmission antenna (H) 31.

The transmitter 100T further includes the three cosine weighters and the three sine weighters, that is to say, the first cosine weighter (Ux(θ, φ)) 13, the second cosine weighter (Uy(θ, φ)) 23, the third cosine weighter (Uz(θ, φ)) 33, the first sine weighter (Vx(θ, φ)) 15, the second sine weighter (Vy(6, (p)) 25 and the third sine weighter (Vz(θ, φ)) 35.

Meanwhile, the receiver 100R includes the three antennas, the three reception mixers and the three reception weighters.

The radio system described in first embodiment, however, is not limited to the three-dimensional one, and may be a two-dimensional one.

Figure 14:
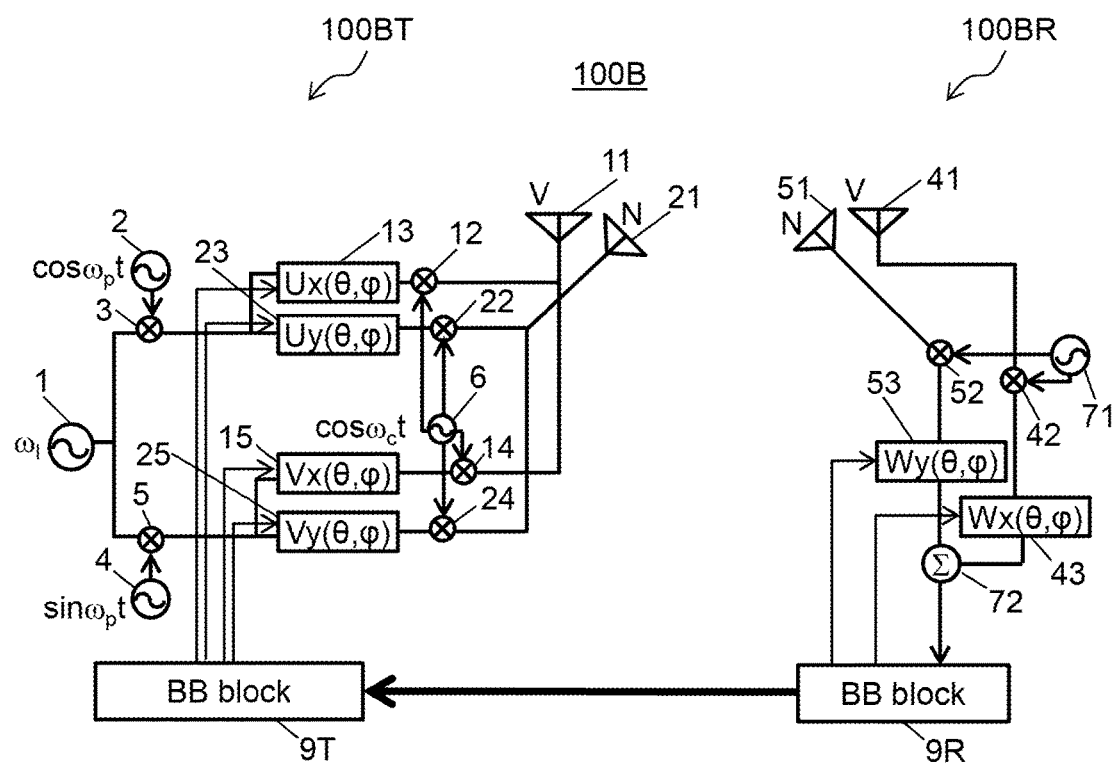
FIG. 14 is a diagram illustrating a configuration example of a radio device in the radio system according to the first embodiment of the present invention illustrated in FIG. 1 which is modified to perform radio communications using polarized waves orthogonal to each other in a two-dimensional space.

FIG. 14 is a diagram illustrating a configuration example of a radio device 100B in the radio system according to the first embodiment of the present invention illustrated in FIG. 1 which is modified to perform radio communications using polarized waves orthogonal to each other in the two-dimensional space.

In FIG. 14, a transmitter 100BT of the radio device 100B includes the information signal generator ($\omega_I$) 1, the polarization rotation cosine oscillator (cos $\omega_p t$) 2, the polarization rotation sine oscillator (sin $\omega_p t$) 4, the first multiplier 3, the second multiplier 5 and the baseband circuit 9 (9T).

The transmitter 100BT further includes the first cosine weighter (Ux(θ, φ)) 13, the second cosine weighter (Uy(θ, φ)) 23, the first sine weighter (Vx(θ, φ)) 15 and the second sine weighter (Vy(θ, φ)) 25.

The transmitter 100BT further includes the carrier frequency generator 6, the first cosine mixer 12, the second cosine mixer 22, the first sine mixer 14 and the second sine mixer 24.

The transmitter 100BT further includes the first transmission antenna (V) 11 and the second transmission antenna (N) 21.

A receiver 100BR includes the first reception antenna (V) 41 and the second reception antenna (N) 51.

The receiver 100BR further includes the first reception mixer 42, the second reception mixer 52 and the local oscillator 71.

The receiver 100BR further includes the first reception weighter 43, the second reception weighter 53, the reception combiner 72 and the baseband circuit 9 (9R).

It should be noted that the baseband circuit (BB block) 9R of the receiver 100BR and the baseband circuit (BB block) 9T of the transmitter 100T jointly form the baseband circuit 9 as a single circuit.

The radio device 100B including the transmitter 100BT and the receiver 100BR is integrally controlled by the baseband circuit 9 (9T, 9R).

As described above, the number of dimensions of the configuration of the radio device 100B illustrated in FIG. 14 is less than the number of dimensions of the configuration in FIG. 1 by one. As described using Formula 1 under the section <<Principle of Rotational Polarization (Circular Polarization)>> in the descriptions for the first embodiment, the two polarized antennas orthogonal to each other are capable of: forming rotationally polarized waves (circularly polarized waves); and using them in the radio communications.

Incidentally, since the number of dimensions of the configuration in FIG. 14 is less than the number of dimensions of the configuration in FIG. 1 by one, duplicated descriptions will be omitted.

Not only the radio system (radio device) of the first embodiment but also the radio systems (radio devices) of the second to eighth embodiments are capable of performing radio communications by use of the two-dimensional rotationally polarized waves (circular polarized waves) via the two mutual orthogonally polarized antennas.

Furthermore, the elevator control system according to the ninth embodiment and the substation facility monitoring system according to the tenth embodiment are also capable of performing radio communications by use of the two-dimensional rotationally polarized waves (circularly polarized waves) via the two orthogonally polarized antennas.

<<Application to Solar Battery Power Generation System>>

In the tenth embodiment illustrated in FIG. 13, a description has been given of an example of the substation facility monitoring system in which multiple substation apparatuses 1201 are arranged. This is not the only example of the application of the radio system.

For example, the above-described radio system is applicable to a power generation facility (solar battery power generation) monitoring system for a solar battery power generation system in which multiple solar batteries are arranged.

Use of electrical wiring for the control or monitoring purpose is not necessarily beneficial to the power generation facility in which multiple solar batteries are arranged. Radio communications, therefore, are used to the control or monitoring.

In this case, a place in which in which multiple solar batteries are arranged is under a multi-path interference environment.

The application of the above-described radio system, therefore, is effective.

REFERENCE SIGNS LIST 1, 101 information signal generator
2, 102 polarization rotation cosine oscillator
3, 5, 82, 92, 103, 105, 202, 204, 212, 214 multiplier 4, 104 polarization rotation sine oscillator
6, 106 carrier frequency generator
9, 9T, 9R, 109 baseband circuit
11, 21, 31, 111, 121, 131 transmission antenna, antenna, polarized antenna
12, 22, 32, 112, 122, 132 cosine mixer
13, 23, 33, 113, 123, 133 cosine weighter
14, 24, 34, 114, 124, 134 sine mixer
15, 25, 35, 115, 125, 135 sine weighter
41, 51, 61, 141, 151, 161 reception antenna, antenna
42, 52, 62, 142, 152, 162 reception mixer
43, 53, 63, 143, 153, 163 reception weighter
71, 171 local oscillator
72, 172 reception combiner
81, 91 strong correlation code generator (strong correlation code generating circuit)
84, 94 synchronization code generator (synchronization code generating circuit)
85 transmission code switcher
93 circulation circuit
95 reception code switcher
100, 200, 300, 400, 700, 800, 100B radio device
100T, 200T, 300T, 400T, 500T, 600T, 700T, 800T, 100BT transmitter
100R, 200R, 300R, 400R, 700R, 800R, 100BR receiver
201, 203 cosine frequency generator
211, 213 sine frequency generator
205 adder
215 subtractor
310 clock generating circuit
311, 321, 331 cosine delta-sigma modulator
312, 322, 332 cosine filter
313, 323, 333 sine delta-sigma modulator
314, 324, 334 sine filter
401, 402, 403 circulator
410, 420, 430 transmission and reception antenna
411, 412, 413 transmission/reception changeover switch
1100 elevator control system
1101 building
1102a, 1102b base station orthogonally polarized integrated antenna
1103a, 1103b, 1213 base station radio device
1111 elevator car
1112a, 1112b terminal station orthogonally polarized integrated antenna
1113, 1203 terminal station radio device
1114 high-frequency cable
1200 substation facility monitoring system
1201 substation apparatuses
1202 terminal station rotationally polarized antenna
1211 base station apparatus
1212 base station rotationally polarized antenna

The invention claimed is:
1. A radio system comprising radio devices each including a transmitter and a receiver, wherein
the transmitter transmits rotationally polarized radio waves in a plurality of transmission propagation directions using a plurality of antennas,
the receiver receives rotationally polarized radio waves in a plurality of reception propagation directions using a plurality of antennas,
the receiver measures changes in rotational loci of polarizations of the radio waves received in the plurality of reception propagation directions corresponding to radio waves transmitted in a plurality of transmission propagation directions, and
the transmitter performs transmission using a reception propagation direction at which the changes measured by the receiver in the rotational loci of the polarizations of the received radio waves stop.
2. The radio system according to claim 1, wherein a rotation frequency of the polarization is less than a frequency of a carrier.
3. The radio system according to claim 1, wherein the transmitter and the receiver each include two antennas spatially orthogonal to each other, and two weighting circuits for weighting inputs to and outputs from the two antennas.
4. The radio system according to claim 1, wherein the transmitter and the receiver each include three antennas spatially orthogonal to one another, and three weighting circuits for weighting inputs to and outputs from the three antennas.
5. The radio system according to claim 1, wherein
the transmitter and the receiver each include a circuit for generating a strong correlation code,
the transmitter transmits an information signal by superimposing the strong correlation code onto the information signal, and
the receiver identifies the polarized radio waves transmitted from the transmitter using the strong correlation code.
6. The radio system according to claim 1, wherein
the transmitter and the receiver each include a circuit for generating a synchronization code,
the transmitter transmits an information signal by superimposing the synchronization code onto the information signal, and
the receiver synchronizes with the transmitter using the synchronization code.
7. The radio system according to claim 1, wherein
the transmitter and the receiver each include a circuit for generating a strong correlation code and a synchronization code,
the transmitter transmits a signal by superimposing the strong correlation code or the synchronization code onto the signal at mutually-different timings, and
the receiver synchronizes with the transmitter using the synchronization code at a predetermine timing, and identifies the polarized radio waves transmitted from the transmitter using the strong correlation code at a timing different from the predetermined timing.
8. A radio system comprising radio devices each including a transmitter and a receiver,
wherein the radio devices repeatedly perform an operation in which
the transmitter transmits rotationally polarized radio waves in a plurality of transmission propagation directions using a plurality of antennas,
the receiver receives rotationally polarized radio waves in a plurality of reception propagation directions using a plurality of antennas,
the receiver measures changes in rotational loci of polarizations of the radio waves received in the plurality of reception propagation directions corresponding to radio waves transmitted in a plurality of transmission propagation directions, and
the transmitter performs transmission using a reception propagation direction at which the changes measured by the receiver in the rotational loci of the polarizations of the received radio waves stop, and
wherein, at a convergence of the reception propagation direction at which the changes measured by the receiver in the rotational loci of the polarizations of the received radio waves stop, the transmitter performs communications using the converged reception propagation direction.

9. A radio system comprising radio devices each including a transmitter and a receiver,
  wherein the radio devices repeatedly perform an operation in which
    the transmitter transmits rotationally polarized radio waves in a plurality of transmission propagation directions using a plurality of antennas,
    the receiver receives rotationally polarized radio waves in a plurality of reception propagation directions using a plurality of antennas,
    the receiver measures changes in rotational loci of polarizations of the radio waves received in the plurality of reception propagation directions corresponding to radio waves transmitted in a plurality of transmission propagation directions, and
    the transmitter performs transmission using a reception propagation direction at which the changes measured by the receiver in the rotational loci of the polarizations of the received radio waves stop,
  wherein, at a convergence of the reception propagation direction at which the changes measured by the receiver in the rotational loci of the polarizations of the received radio waves stop, the transmitter stores the converged reception propagation direction,
  wherein the transmitter selects a new transmission propagation direction spatially orthogonal to the converged reception propagation direction, and the transmitter and the receiver resume transmission and reception starting with the new transmission propagation direction to repeat the operation obtaining a convergence of the reception propagation direction at which the changes measured by the receiver in the rotational loci of the polarizations of the received radio waves stop, and
  wherein the transmitter and the receiver perform communications therebetween using the converged reception propagation directions.

10. The radio system according to claim 9,
  wherein, after obtaining a plurality of the converged reception propagation directions, the transmitter and the receiver perform communications using one of the plurality of the converged reception propagation directions.

11. An elevator control system comprising the radio system according to claim 1.

12. A substation facility monitoring system comprising the radio system according to claim 1.

* * * * *